(12) United States Patent  (10) Patent No.: US 8,040,580 B2
Nakamura  (45) Date of Patent: Oct. 18, 2011

(54) IMAGE FORMING APPARATUS, CONTROL METHOD THEREFOR, AND COMPUTER PROGRAM

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 12/179,140

(22) Filed: Jul. 24, 2008

(65) Prior Publication Data

US 2009/0034029 A1 Feb. 5, 2009

(30) Foreign Application Priority Data

Jul. 31, 2007 (JP) ................................. 2007-199900

(51) Int. Cl.
*H04N 1/46* (2006.01)
(52) U.S. Cl. ....... 358/505; 358/1.9; 358/3.23; 358/1.14; 347/237; 347/240; 382/182; 382/176
(58) Field of Classification Search .................. 358/505, 358/1.9, 3.23, 3.03, 1.14, 3.28, 2.1, 3.21, 358/1.16, 448, 444, 521, 524, 534; 347/237, 347/240, 247, 251, 254; 382/187, 176
See application file for complete search history.

(56) References Cited

U.S. PATENT DOCUMENTS

| 5,235,436 | A | 8/1993 | Sakamoto et al. ............. 358/462 |
| 5,438,431 | A | 8/1995 | Ostromoukhov ............. 358/457 |
| 5,815,605 | A | 9/1998 | Koike ............................ 382/269 |
| 6,134,022 | A * | 10/2000 | Yamamoto et al. ............ 358/1.9 |
| 6,236,827 | B1 * | 5/2001 | Hada ............................. 399/301 |
| 6,487,309 | B1 | 11/2002 | Chen .............................. 382/162 |
| 6,731,400 | B1 | 5/2004 | Nakamura et al. ............. 358/1.9 |
| 6,963,423 | B2 | 11/2005 | Ogasahara ..................... 358/1.8 |
| 7,286,717 | B2 * | 10/2007 | Nomizu ........................ 382/280 |
| 7,684,079 | B2 * | 3/2010 | Takata et al. ................... 358/1.9 |
| 2003/0206308 | A1 * | 11/2003 | Matsuya ........................ 358/1.9 |
| 2006/0119895 | A1 | 6/2006 | Takata et al. ................. 358/3.26 |
| 2006/0226338 | A1 | 10/2006 | Tojima et al. .............. 250/208.1 |
| 2006/0232620 | A1 | 10/2006 | Kitamura et al. ............... 342/15 |
| 2007/0103728 | A1 | 5/2007 | Otani ........................... 358/1.18 |
| 2009/0034007 | A1 * | 2/2009 | Sano et al. .................... 358/3.13 |
| 2009/0034034 | A1 * | 2/2009 | Ido ................................ 358/525 |

FOREIGN PATENT DOCUMENTS

| JP | 2002-116394 | 4/2002 |
| JP | 2003-241131 | 8/2003 |
| JP | 2004-170755 | 6/2004 |

* cited by examiner

*Primary Examiner* — Negussie Worku
(74) *Attorney, Agent, or Firm* — Fitzpatrick, Cella, Harper & Scinto

(57) ABSTRACT

Attribute information accessory to a pixel can be used to determine whether to execute an interpolation process of less than one pixel at a scan line changing point in color misregistration compensation for a printout from an image forming apparatus having a characteristic shifted in the laser scanning direction for each color. When the attribute information is an attribute representing execution of the interpolation process of less than one pixel, it is enlarged in the sub-scanning direction. Attribute information of each color component can be generated from attribute information accessory to a pixel by using the attribute information accessory to the pixel, and each color component value which forms the pixel.

13 Claims, 25 Drawing Sheets

FIG. 5A
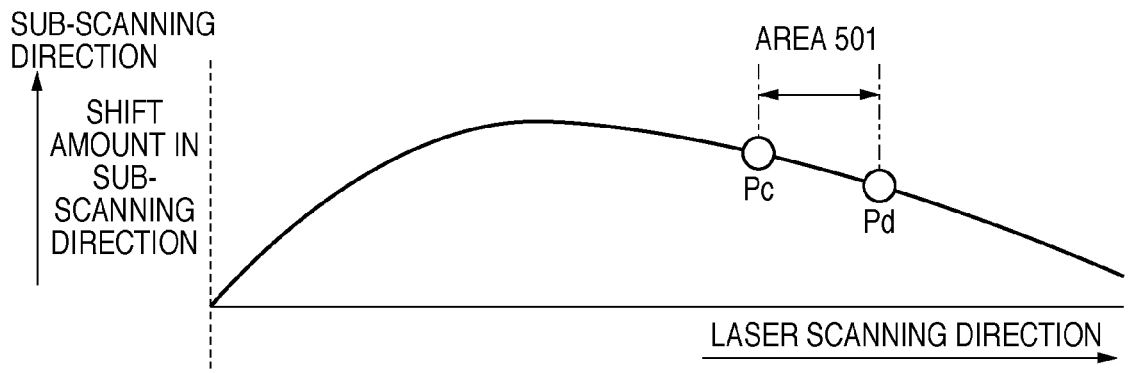
FIG. 5B
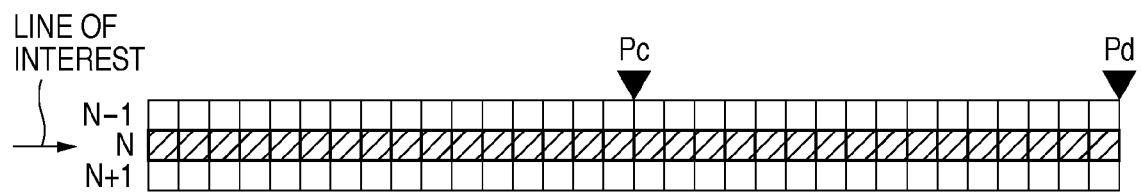
FIG. 5C
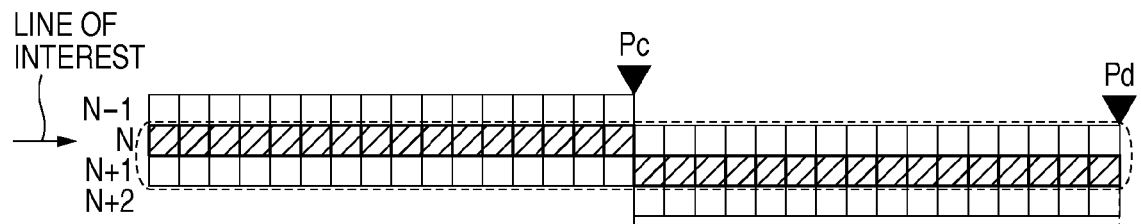
FIG. 5D
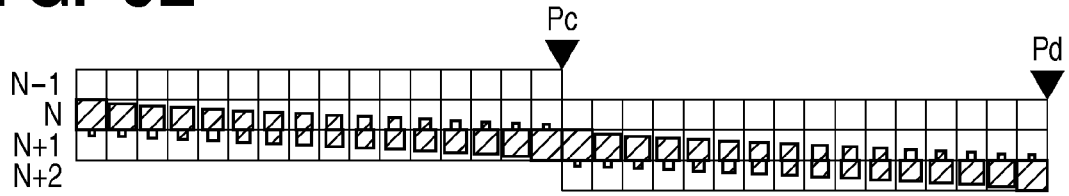
FIG. 5E

SHIFT DIRECTION : POSITIVE

SHIFT DIRECTION : NEGATIVE

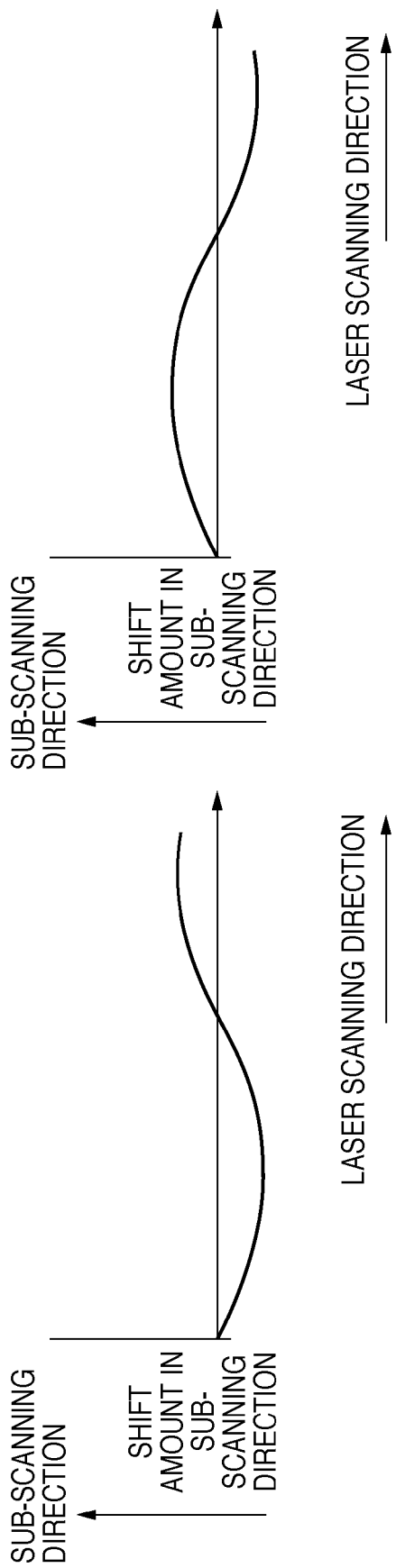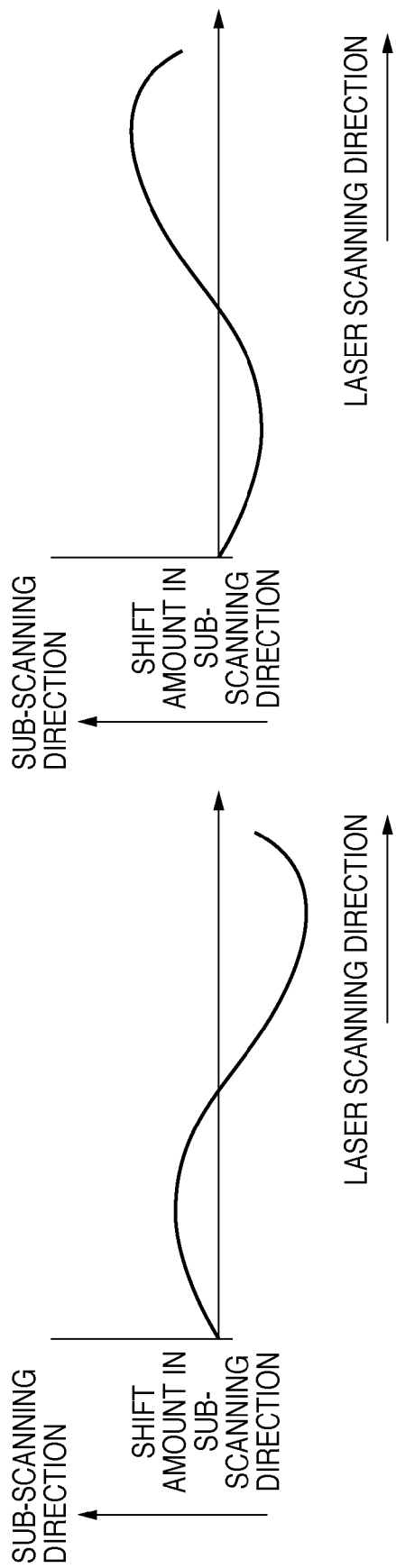

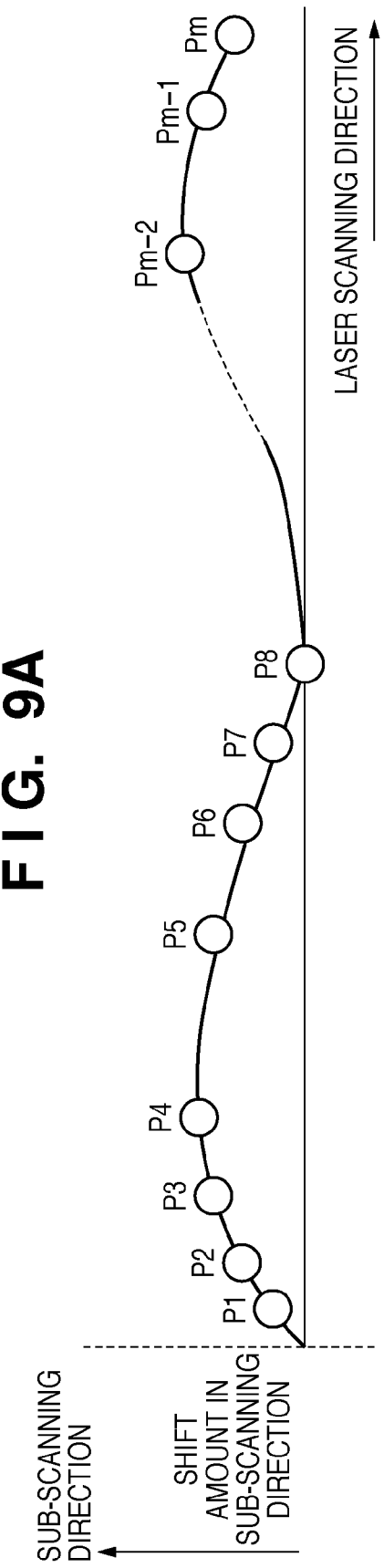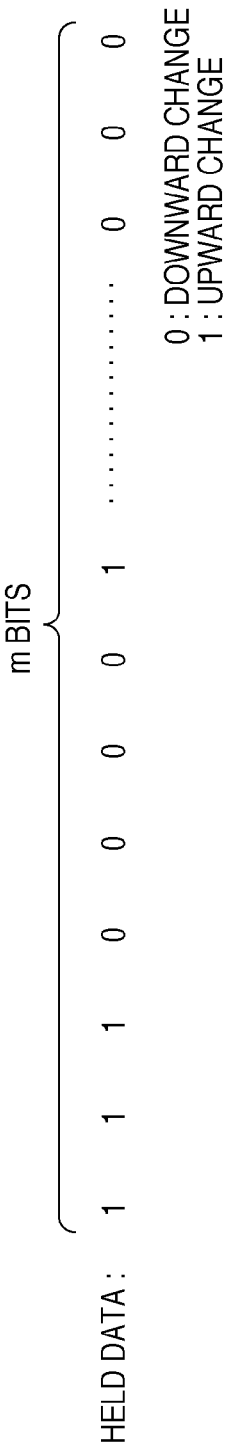

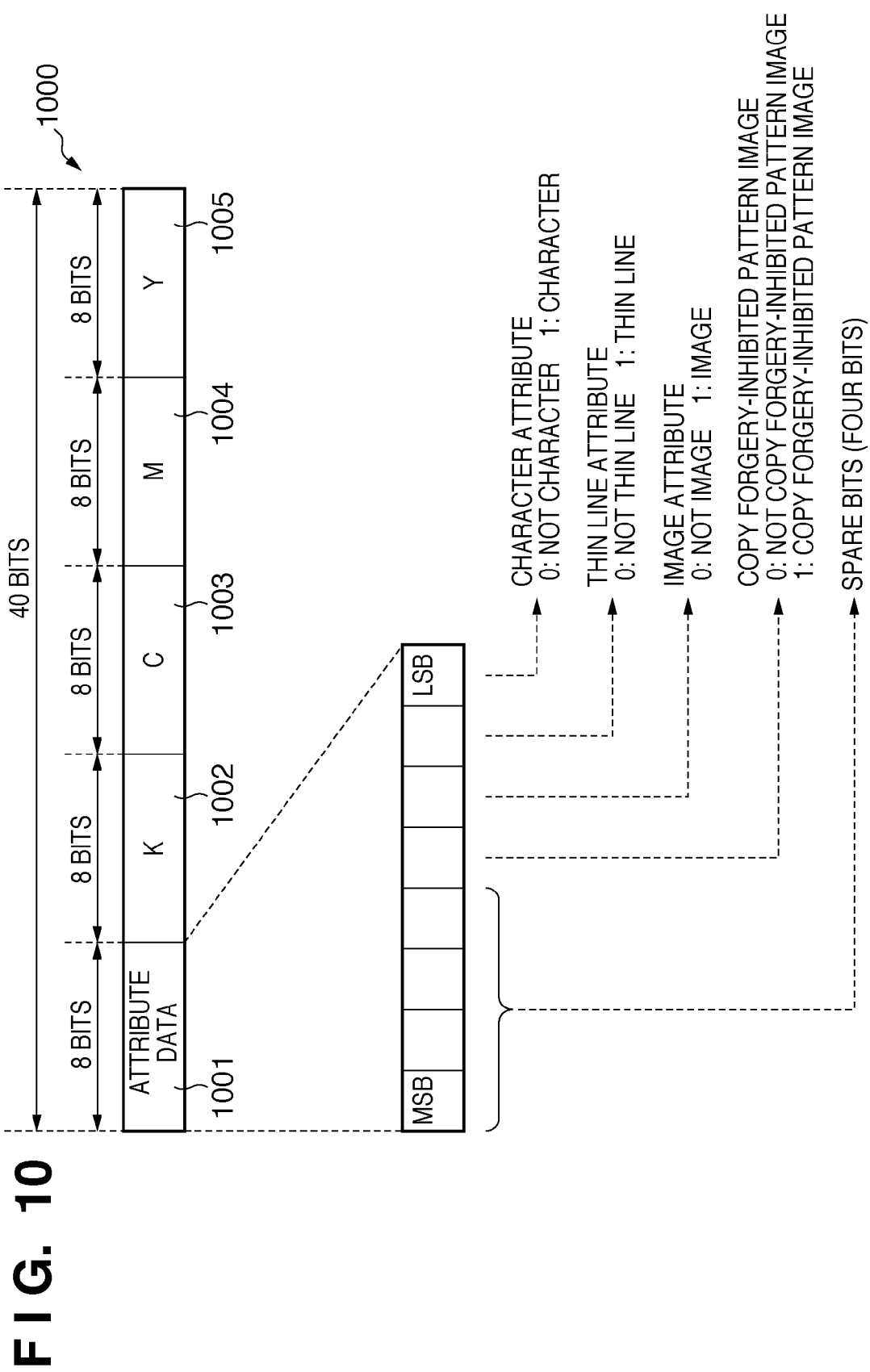

☐ CHARACTER(1)
▨ NOT CHARACTER(0)

Y=0 LINE
Y=1 LINE
Y=2 LINE
Y=3 LINE

<SHIFT IN POSITIVE DIRECTION>

Y=0 LINE
Y=1 LINE
Y=2 LINE
Y=3 LINE

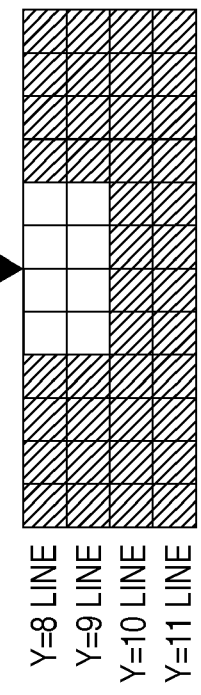
F I G. 13B
Y=8 LINE
Y=9 LINE
Y=10 LINE
Y=11 LINE
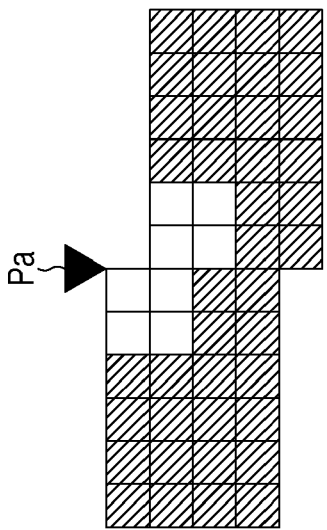
F I G. 13D
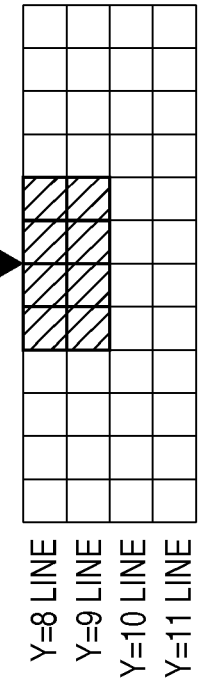
<SHIFT IN NEGATIVE DIRECTION>
F I G. 13A
Y=8 LINE
Y=9 LINE
Y=10 LINE
Y=11 LINE
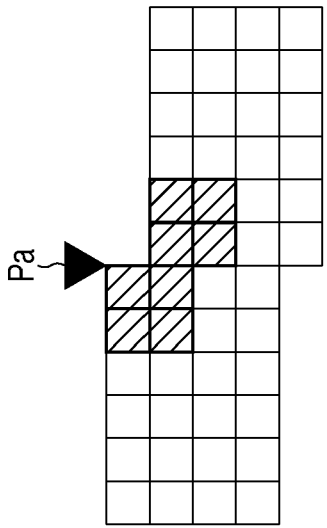
F I G. 13C
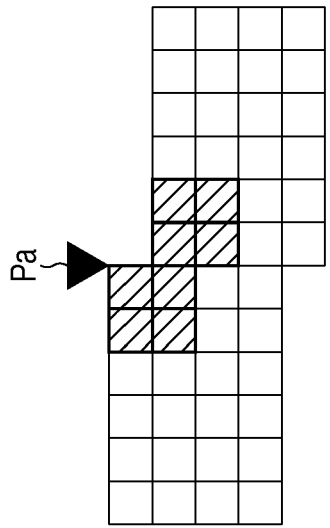
F I G. 13E

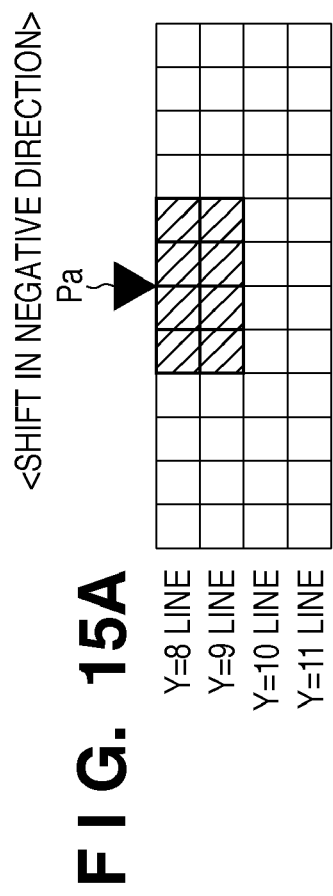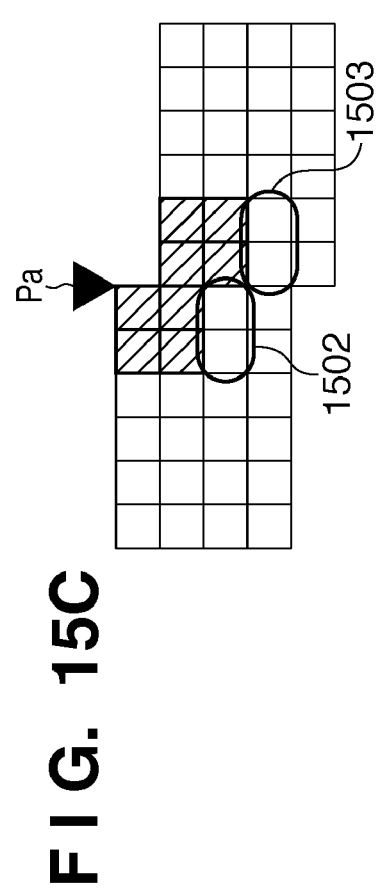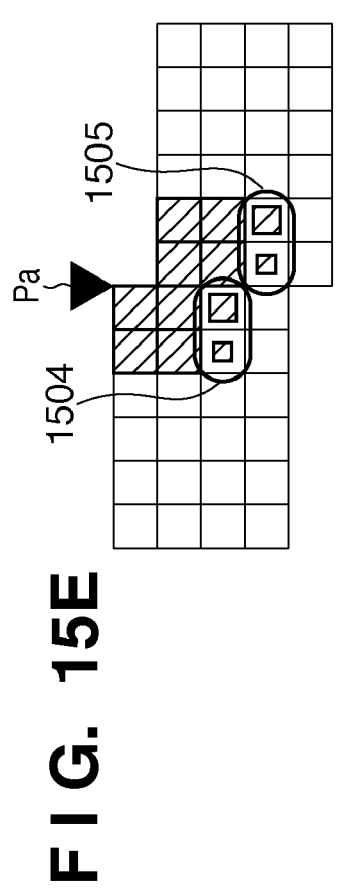

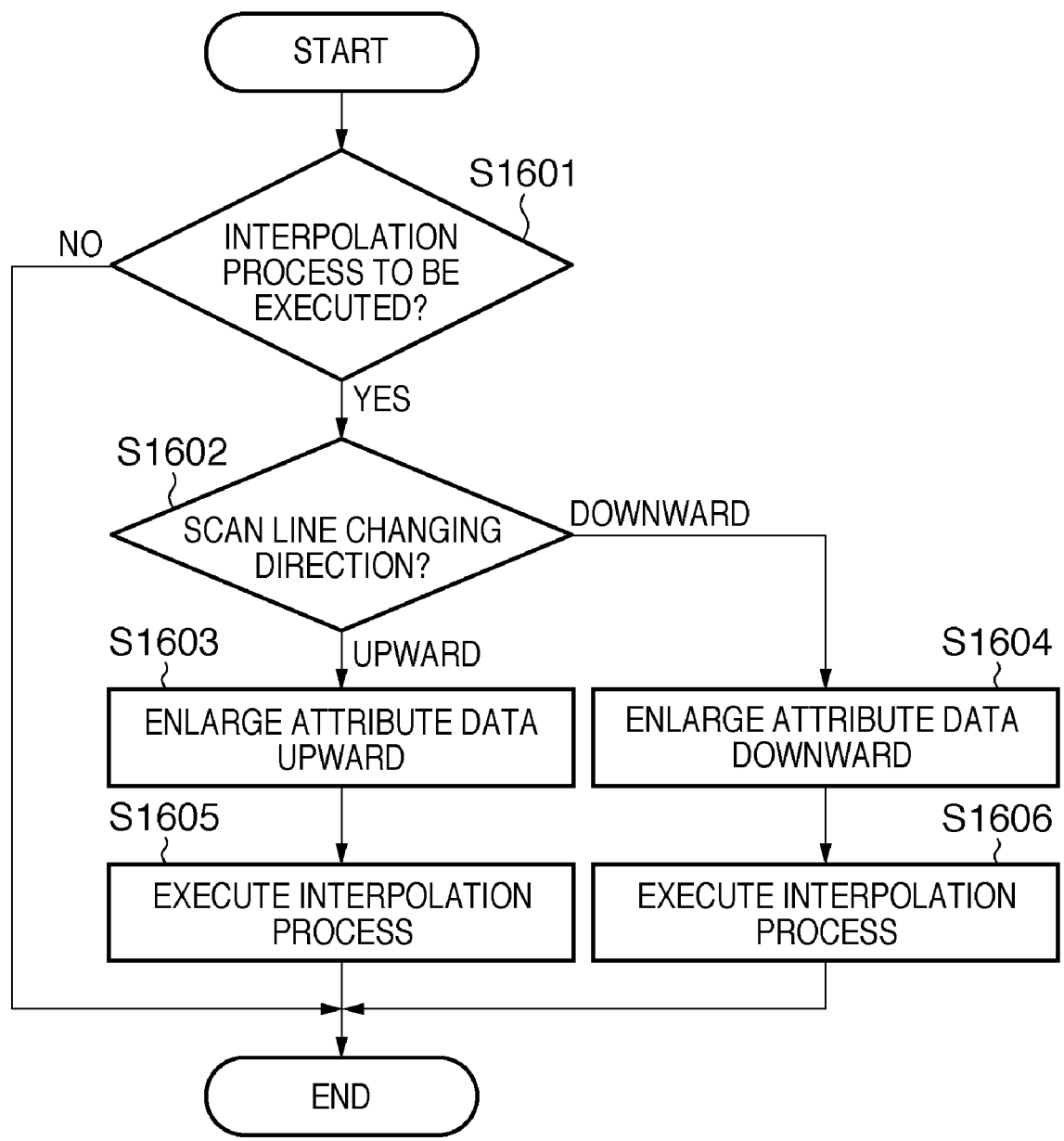

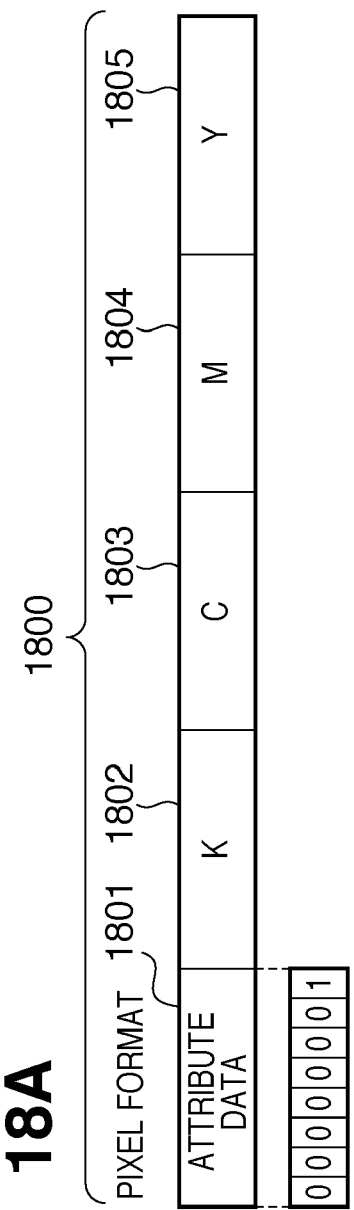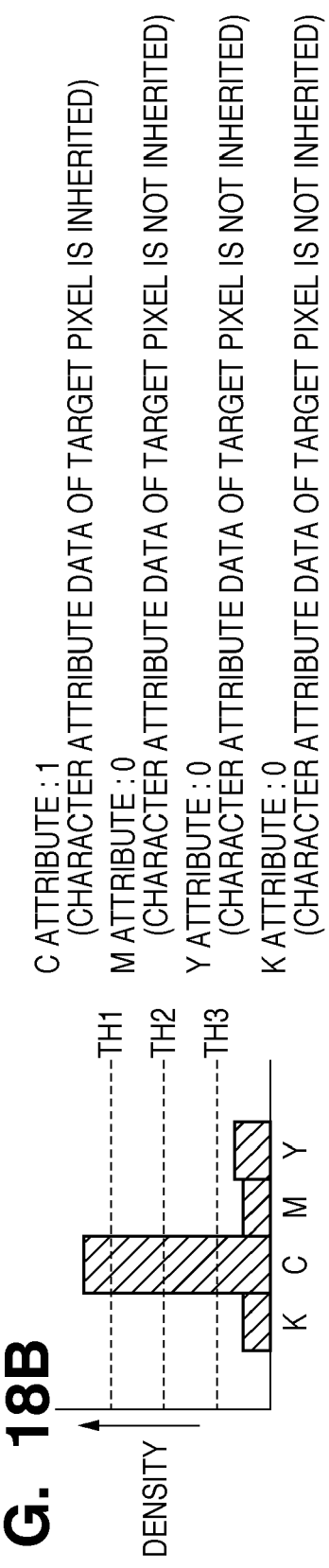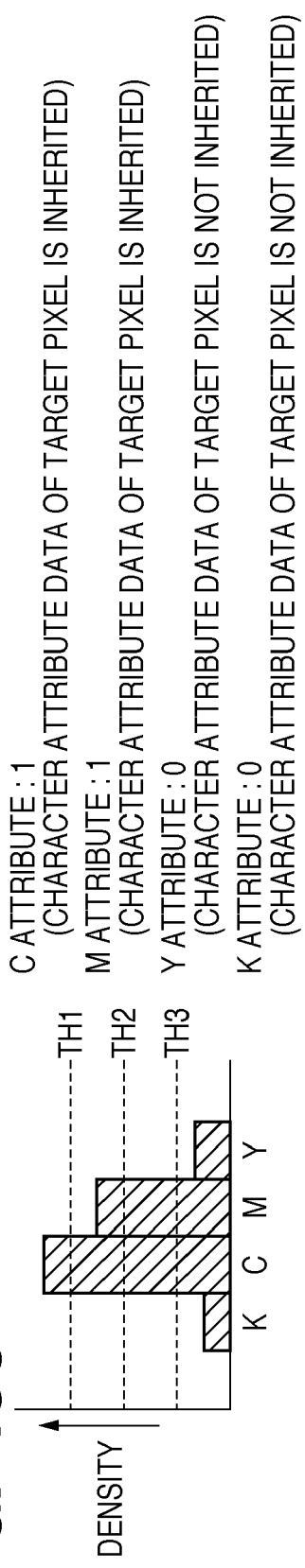

FIG. 20

| | | |
|---|---|---|
| C ≥ TH1 | M ≥ TH1 | M INHERITS CHARACTER ATTRIBUTE OF ATTRIBUTE DATA. |
| | TH1 > M ≥ TH2 | M INHERITS CHARACTER ATTRIBUTE OF ATTRIBUTE DATA. |
| | TH2 > M ≥ TH3 | M DOES NOT INHERIT CHARACTER ATTRIBUTE OF ATTRIBUTE DATA. |
| | TH3 > M | M DOES NOT INHERIT CHARACTER ATTRIBUTE OF ATTRIBUTE DATA. |
| | Y ≥ TH1 | Y INHERITS CHARACTER ATTRIBUTE OF ATTRIBUTE DATA. |
| | TH1 > Y ≥ TH2 | Y INHERITS CHARACTER ATTRIBUTE OF ATTRIBUTE DATA. |
| | TH2 > Y ≥ TH3 | Y INHERITS CHARACTER ATTRIBUTE OF ATTRIBUTE DATA. |
| | TH3 > Y | Y DOES NOT INHERIT CHARACTER ATTRIBUTE OF ATTRIBUTE DATA. |
| ⋮ | ⋮ | ⋮ |

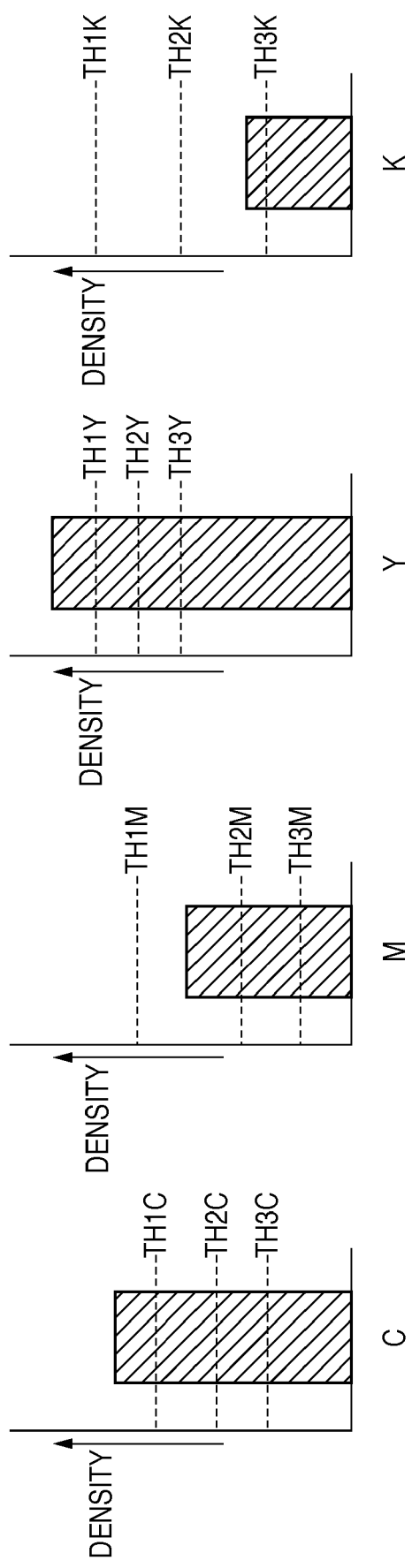

INCLINATION SHIFT AMOUNT

BITMAP IMAGE (BEFORE TONE CORRECTION)

CORRECTED BITMAP IMAGE

BITMAP IMAGE (AFTER TONE CORRECTION)

EXPOSURE IMAGE

IMAGE FORMING APPARATUS, CONTROL METHOD THEREFOR, AND COMPUTER PROGRAM

BACKGROUND OF THE INVENTION

1. Field of the Invention

The present invention relates to an image forming apparatus, a control method therefor, and a computer program.

2. Description of the Related Art

An electrophotographic method is known as an image printing method used in a color image forming apparatus such as a color printer or color copying machine. According to the electrophotographic method, a latent image is formed on a photosensitive drum using a laser beam, and developed with a charged printing material (to be referred to as toner hereinafter). The image is printed by transferring the developed toner image onto transfer paper and fixing it.

These days, tandem type color image forming apparatuses are becoming popular. To increase the image forming speed of the electrophotographic color image forming apparatus, the tandem type color image forming apparatus comprises developing units and photosensitive drums equal in number to toner colors and sequentially transfers images of different colors onto an image conveyance belt or printing medium. It is known that the tandem type color image forming apparatus has a plurality of factors which cause a registration error. A variety of measures against the respective factors have been proposed.

These factors include the unevenness and attaching positional error of the lens of a deflecting scanning device, and the mounting positional error of the deflecting scanning device to the color image forming apparatus main body. Owing to these positional errors, the scan line inclines or skews, and the degree of inclination or skew (to be referred to as the profile hereinafter) is different between colors, causing a registration error.

The profile has different characteristics for respective image forming apparatuses, that is, printing engines, and for respective colors. FIGS. 22A to 22D show examples of the profile. In FIGS. 22A to 22D, the abscissa axis represents a position in the main scanning direction in the image forming apparatus. Lines 2201, 2202, 2203, and 2204 expressed as straight lines in the main scanning direction represent ideal characteristics free from a skew. Curves 2205, 2206, 2207, and 2208 represent the profiles of respective colors. More specifically, the curve 2205 represents a cyan (to be referred to as C hereafter) characteristic, the curve 2206 represents a magenta (to be referred to as M hereafter) characteristic, the curve 2207 represents a yellow (to be referred to as Y hereafter) characteristic, and the curve 2208 represents a black (to be referred to as K hereafter) characteristic. The ordinate axis represents a shift amount in the sub-scanning direction from an ideal characteristic. As is apparent from FIGS. 22A to 22D, the change point of the curve is different between colors. This difference appears as the registration error in image data after fixing.

As a measure against the registration error, there is proposed a method of measuring the degree of skew of a scan line using an optical sensor in the process of assembling a deflecting scanning device, mechanically rotating the lens to adjust the skew of the scan line, and fixing the lens with an adhesive (see Japanese Patent Laid-Open No. 2002-116394).

There is proposed a method of measuring the degree of inclination of a scan line using an optical sensor in the process of mounting a deflecting scanning device into a color image forming apparatus main body, mechanically inclining the deflecting scanning device to adjust the inclination of the scan line, and then mounting the deflecting scanning device into the apparatus main body (see Japanese Patent Laid-Open No. 2003-241131).

There is also proposed a method of measuring the degrees of inclination and skew of a scan line using an optical sensor, compensating bitmap image data to cancel them, and forming the compensated image (see Japanese Patent Laid-Open No. 2004-170755). This method electrically compensates the registration error by processing image data, and thus does not require a mechanical adjustment member or adjustment step in assembly. This method can downsize a color image forming apparatus, and deal with a registration error at a lower cost than those by the two mechanical adjustment methods described above. The electrical registration error compensation is divided into compensation of one pixel and that of less than one pixel.

In compensation of one pixel, pixels are offset one by one in the sub-scanning direction in accordance with the inclination and skew compensation amounts, as shown in FIGS. 23A to 23C. In the following description, a pixel position where the pixel is offset will be called a "scan line changing point". In FIG. 23A, P1 to P5 are scan line changing points.

In order to reproduce data of the nth line, as shown in FIG. 23B, a coordinate conversion process is done for each pixel by offset. FIG. 23C shows an exposure image obtained by exposing the image carrier in accordance with image data having undergone color misregistration compensation for each pixel.

In compensation of less than one pixel, the tone value of bitmap image data is adjusted by preceding and succeeding pixels in the sub-scanning direction, as shown in FIGS. 24A to 24E.

FIG. 24A shows a main scan line having a positive inclination. FIG. 24A shows a case where the scan line is shifted by one pixel in the sub-scanning direction every time it proceeds by five pixels in the main scanning direction. FIG. 24B shows bitmap image of a horizontal straight line before performing density conversion. FIG. 24C shows a compensated bitmap image when performing compensation to cancel color misregistration caused by the inclination of a main scan line in FIG. 24A. To obtain such an image, the exposure amount of preceding and succeeding dots in the sub-scanning direction needs to be adjusted. FIG. 24D shows a bitmap image having undergone density conversion for adjusting the exposure ratio of preceding and succeeding pixels in the sub-scanning direction. FIG. 24E shows the exposure image of the bitmap image having undergone density conversion on the image carrier. The inclination of the main scan line is canceled to form a horizontal straight line.

That is, when the profile characteristic skews upward, as shown in FIG. 23A, bitmap image data before tone compensation is processed in a direction opposite to one indicated by the profile in the sub-scanning direction. By executing compensation of less than one pixel according to this method, an unnatural step generated by compensation of one pixel at a scan line changing point can be canceled to smooth the image.

SUMMARY OF THE INVENTION

However, the conventional technique performs image interpolation of less than one pixel at a scan line changing point for all image data, and does not consider application of interpolation of less than one pixel in accordance with each arrangement of image data. Image data output to an image forming apparatus vary from a character image formed from font data to a thin line image typified by a table and an image typified by a graphic image or photographic image. Some image data composite a copy-inhibited image (to be referred to as a copy forgery-inhibited pattern image hereinafter) formed from a predetermined regular pattern on document image data to be printed out. These image data do not always require interpolation of less than one pixel at a scan line changing point.

For example, interpolation of less than one pixel is indispensable for images which put importance on the linkage between pixels before and after a scan line changing point, for example, a character image and thin line image. However, for a graphic image, photographic image, and copy forgery-inhibited pattern image, it is preferable not to execute interpolation process of less than one pixel at a scan line changing point. This is because the original tonality can be maintained and color inconsistency near the scan line changing point can be suppressed.

The present invention enables to control, based on the attribute of each pixel in image data, whether or not to execute an interpolation process.

According to one aspect of the present invention, there is provided an image forming apparatus having an image forming unit which forms an image by using an image carrier, an exposure unit for exposing the image carrier, and a developing unit for visualizing, with a printing material, an electrostatic latent image generated by exposure, the apparatus comprising: a profile storage unit configured to store a profile representing a shift amount of an exposure position in a sub-scanning direction when exposing the image carrier while scanning the image carrier in a main scanning direction; a determination unit configured to determine, based on the profile, a pixel position in the main scanning direction where the shift amount in the sub-scanning direction is to be compensated; an image data storage unit configured to store image data containing density values of color components and first attribute data for each pixel; a readout unit configured to read out the image data from the image data storage unit by shifting a readout position in the sub-scanning direction at the determined pixel position; an attribute correction unit configured to correct the first attribute data serving as part of the image data by referring to the first attribute data of the readout image data, and when the first attribute data representing a specific attribute exists, enlarge, in a direction corresponding to a direction in which the readout position is shifted, an area where the first attribute data representing the specific attribute exists; and an interpolation unit configured to interpolate a pixel value for image data within an area determined based on the corrected first attribute data, wherein an image is formed using the interpolated pixel value.

Also, according to another aspect of the present invention, there is provided a method of controlling an image forming apparatus having an image forming unit which forms an image by using an image carrier, an exposure unit for exposing the image carrier, and a developing unit for visualizing, with a printing material, an electrostatic latent image generated by exposure, and an image data storage unit that stores image data containing density values of color components and first attribute data for each pixel, the method characterized by comprising: a determination step of determining, based on a profile representing a shift amount of an exposure position in a sub-scanning direction when exposing the image carrier while scanning the image carrier in a main scanning direction, a pixel position in the main scanning direction where the shift amount in the sub-scanning direction is to be compensated; a readout step of reading out the image data from the image data storage unit by shifting a readout position in the sub-scanning direction at the determined pixel position; an attribute correction step of correcting the first attribute data serving as part of the image data by referring to the first attribute data of the readout image data, and when the first attribute data representing a specific attribute exists, enlarging, in a direction corresponding to a direction in which the readout position is shifted, an area where the first attribute data representing the specific attribute exists; an interpolation step of interpolating a pixel value for image data within an area determined based on the corrected first attribute data; and an image forming step of forming an image by using the interpolated pixel value.

Further features of the present invention will become apparent from the following description of exemplary embodiments (with reference to the attached drawings).

BRIEF DESCRIPTION OF THE DRAWINGS

FIGS. 5A to 5E are views for explaining an interpolation method when the skew characteristic of the color image forming apparatus is in the negative direction along the sub-scanning direction according to the embodiment of the present invention;

FIGS. 7A to 7D are graphs showing the correlation between the shift direction and the compensation direction based on the profile definition according to the embodiment of the present invention;

FIGS. 9A to 9C are views showing an example of the profile characteristic data holding form according to the embodiment of the present invention;

FIG. 10 is a view showing an example of the structure of one pixel data according to the embodiment of the present invention;

FIGS. 13A to 13E are views for explaining another example of the interpolation effect when no attribute information is enlarged in the sub-scanning direction according to the first embodiment of the present invention;

FIGS. 15A to 15E are views for explaining an example of the interpolation effect when attribute information is enlarged in the sub-scanning direction according to the first embodiment of the present invention;

FIG. 16 is a flowchart of a process according to the first embodiment of the present invention;

FIGS. 18A to 18E are views for explaining an example of attribute data inheritance conditions according to the second embodiment of the present invention;

FIG. 20 is a table for explaining another example of attribute data inheritance conditions according to the second embodiment of the present invention;

FIGS. 21A to 21D are graphs for explaining an example of changing a set threshold for each color component according to the second embodiment of the present invention;

DESCRIPTION OF THE EMBODIMENTS

Preferred embodiments of the present invention will be described below with reference to the accompanying drawings.

First Embodiment

Figure 1:
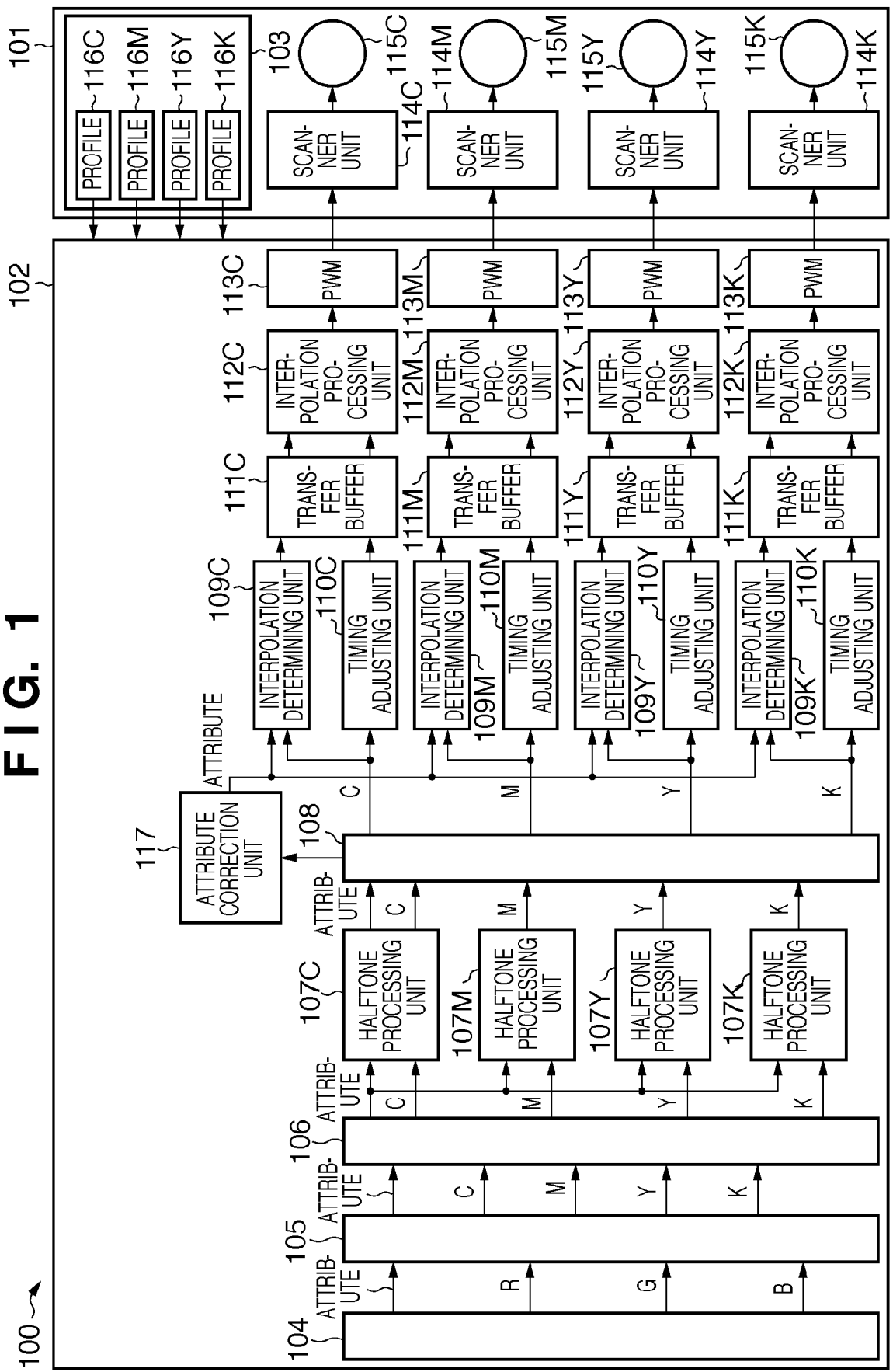
FIG. 1 is a block diagram showing an example of the internal arrangement of a color image forming apparatus according to an embodiment of the present invention.

FIG. 1 is a block diagram showing an example of the arrangements of blocks associated with formation of an electrostatic latent image in an electrophotographic color image forming apparatus 100 according to the first embodiment. The color image forming apparatus 100 comprises an image forming section 101 and image processing section 102. The image processing section 102 generates bitmap image information, and the image forming section 101 forms an image on a printing medium on the basis of the bitmap image information.

Figure 2:
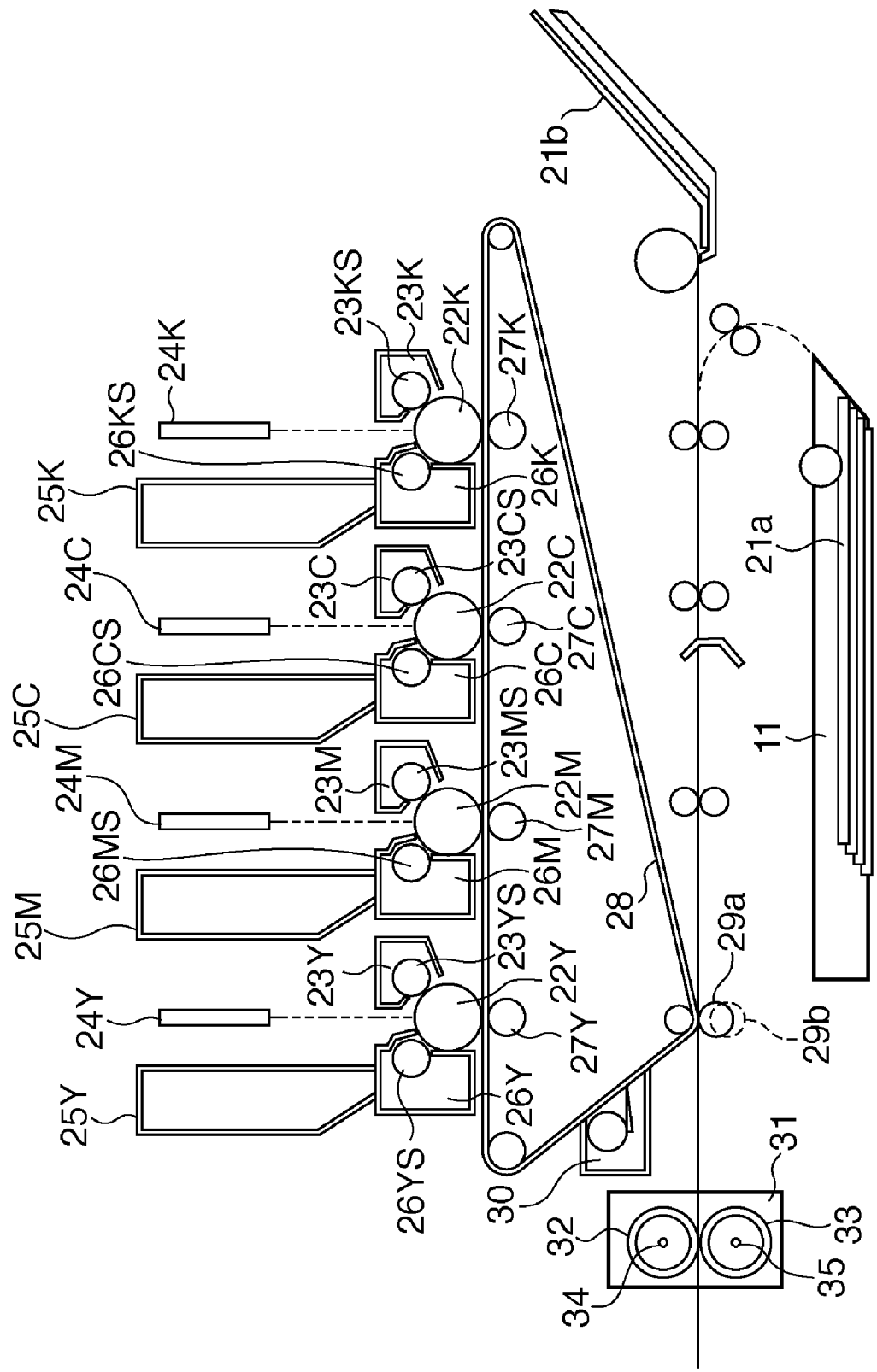
FIG. 2 is a sectional view showing an example of the section of an electrophotographic color image forming apparatus according to the embodiment of the present invention.

FIG. 2 is a sectional view showing an example of the section of the color image forming apparatus 100 according to the first embodiment of the present invention. FIG. 2 shows the section of a tandem type color image forming apparatus adopting an intermediate transfer member 28 as an example of the color image forming apparatus. The operation of the image forming section 101 in the electrophotographic color image forming apparatus 100 will be explained with reference to FIG. 2.

The image forming section 101 drives exposure light in accordance with an exposure time processed by the image processing section 102, forming an electrostatic latent image. The image forming section 101 develops the electrostatic latent image to form a single-color toner image. The image forming section 101 composites single-color toner images to form a multi-color toner image. The image forming section 101 transfers the multi-color toner image to a printing medium 11, and fixes it to the printing medium.

The charging unit comprises four injection chargers 23Y, 23M, 23C, and 23K for charging photosensitive bodies 22Y, 22M, 22C, and 22K serving as image carriers for respective Y, M, C, and K printing materials. The injection chargers incorporate sleeves 23YS, 23MS, 23CS, and 23KS. The photosensitive bodies 22Y, 22M, 22C, and 22K rotate upon receiving the driving forces of driving motors (not shown). The driving motors rotate the photosensitive bodies 22Y, 22M, 22C, and 22K counterclockwise in accordance with the image forming operation.

The exposure unit irradiates the photosensitive bodies 22Y, 22M, 22C, and 22K with exposure light from scanner units 24Y, 24M, 24C, and 24K, selectively exposing the surfaces of the photosensitive bodies 22Y, 22M, 22C, and 22K and forming electrostatic latent images on them.

The developing unit comprises four developing units 26Y, 26M, 26C, and 26K for Y, M, C, and K in order to visualize electrostatic latent images. The developing units incorporate sleeves 26YS, 26MS, 26CS, and 26KS. Each developing unit 26 is detachable.

To transfer a single-color toner image from the photosensitive body 22 to the intermediate transfer member 28, the transfer mechanism rotates the intermediate transfer member 28 clockwise, and transfers the single-color toner image along with rotation of the photosensitive body 22Y and the like and a facing primary transfer roller 27Y and the like. A single-color toner image is efficiently transferred onto the intermediate transfer member 28 by applying a proper bias voltage to the primary transfer roller 27, and making the rotational speed of the photosensitive body 22 different from that of the intermediate transfer member 28. This transfer is called "primary transfer".

The transfer mechanism composites single-color toner images onto the intermediate transfer member 28 in respective stations, and conveys the composited multi-color toner image to a secondary transfer roller 29 as the intermediate transfer member 28 rotates. The printing medium 11 is clamped and conveyed from a paper feed tray 21 to the secondary transfer roller 29, and the multi-color toner image on the intermediate transfer member 28 is transferred onto the print medium 11. A proper bias voltage is applied to the secondary transfer roller 29 to electrostatically transfer the toner image. This transfer is called "secondary transfer". While transferring the multi-color toner image onto the printing medium 11, the secondary transfer roller 29 abuts against the printing medium 11 at a position 29a, and separates to a position 29b after printing.

The fixing mechanism comprises a fixing roller 32 for heating the printing medium 11, and a press roller 33 for pressing the printing medium 11 against the fixing roller 32, in order to fuse and fix, on the printing medium 11, a multi-color toner image transferred on the printing medium 11. The fixing roller 32 and press roller 33 are hollow and incorporate heaters 34 and 35, respectively. A fixing unit 31 conveys the printing medium 11 bearing the multi-color toner image by the fixing roller 32 and press roller 33, and applies heat and pressure to fix the toner to the printing medium 11.

The toner-fixed printing medium 11 is discharged by discharge rollers (not shown) onto a delivery tray (not shown), and the image forming operation ends. A cleaning unit 30 cleans off toner left on the intermediate transfer member 28. Waste toner left after transferring four color toner images formed on the intermediate transfer member 28 to the printing medium 11 is stored in a cleaner vessel.

Figure 3A:
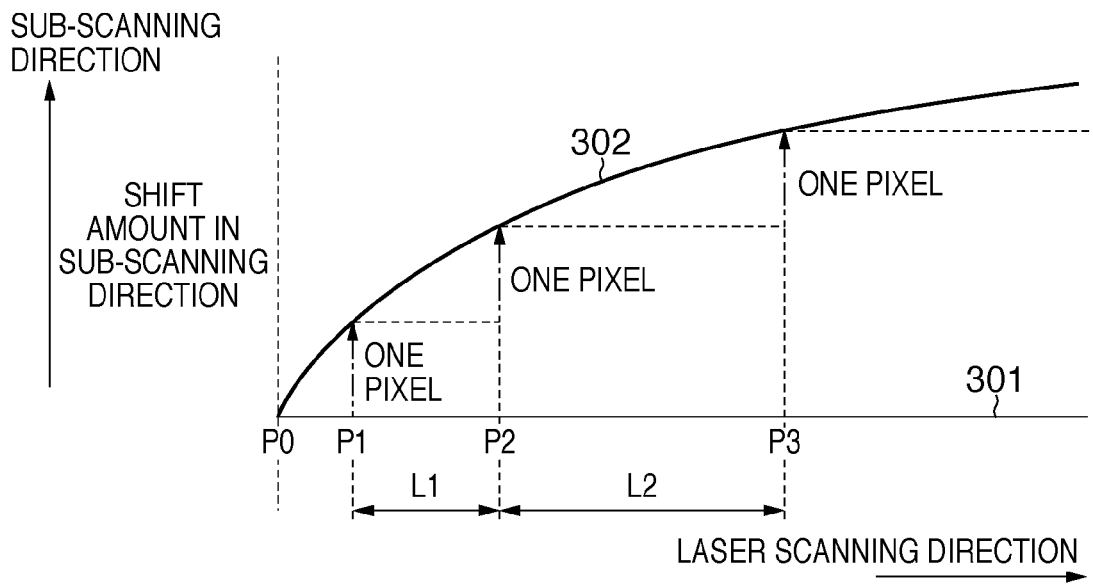
FIGS. 3A and 3B are graphs showing examples of the profile characteristic of a scan line for each color in the color image forming apparatus according to the embodiment of the present invention.
Figure 3B:
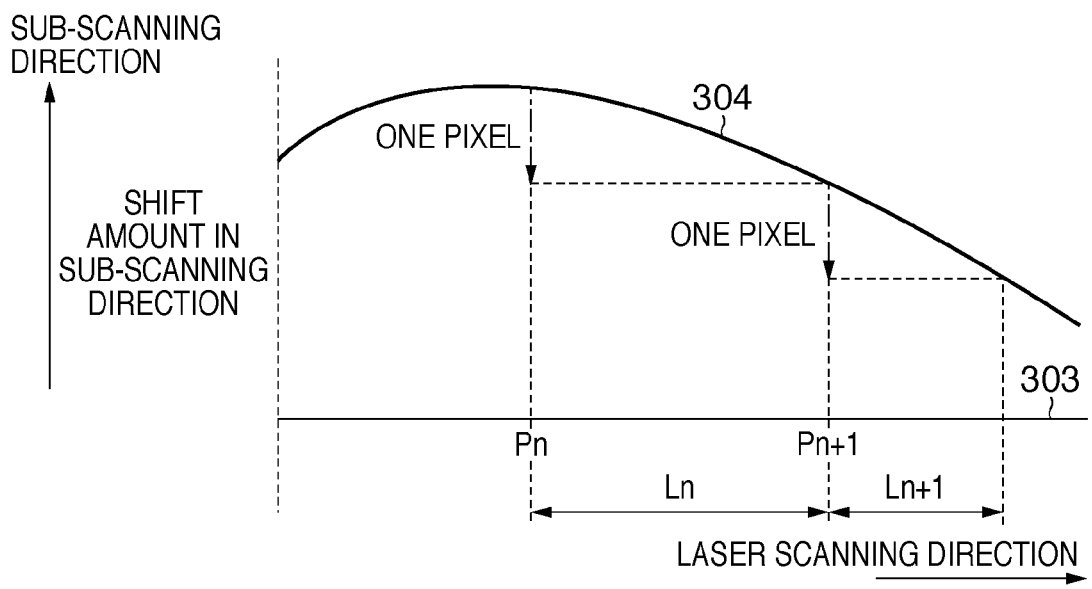

The profile characteristic of a scan line for each color in the image forming apparatus 100 will be explained with reference to FIGS. 3A and 3B. FIG. 3A is a graph showing an area in which the exposure position is shifted in the positive direction along the sub-scanning direction as a profile characteristic of the image forming apparatus 100. FIG. 3B is a graph showing an area in which the exposure position is shifted in the negative direction along the sub-scanning direction as a profile characteristic of the image forming apparatus 100.

In FIGS. 3A and 3B, scan lines 301 and 303 are ideal scan lines, and represent characteristics when the photosensitive body 22 is scanned perpendicularly to the rotational direction of the photosensitive body 22. In the following description, the profile characteristic assumes a direction in which the image processing section 102 compensates the profile characteristic. However, the definition of the profile characteristic is not limited to this. It is also possible to define the shift direction in the image forming section 101 and compensate the characteristic in the opposite direction by the image processing section 102.

FIGS. 7A to 7D show the correlation between the shift direction and the compensation direction based on the profile definition according to the first embodiment of the present invention. In FIGS. 7A to 7D, the abscissa axis represents the laser scanning direction, and the ordinate axis represents the sub-scanning direction. When the skew characteristic of the image forming section 101 is a profile characteristic as shown in FIG. 7A, the direction in which the image processing section 102 performs compensation is one shown in FIG. 7B. When the skew characteristic of the image forming section 101 is a profile characteristic as shown in FIG. 7C, the direction in which the image processing section 102 performs compensation is one shown in FIG. 7D.

As profile characteristic data, a pixel position corresponding to a scan line changing point in the laser scanning direction (main scanning direction), and the direction of change to the next scan line changing point in the sub-scanning direction can be held as shown in FIGS. 9A to 9C. More specifically, scan line changing points P1, P2, P3, . . . , Pm are defined for the profile characteristic shown in FIG. 9A. Each scan line changing point is defined as a point where the scan line is shifted by one pixel in the sub-scanning direction. As the shift direction, the scan line is shifted in the positive or negative direction along the sub-scanning direction until the next scan line changing point.

For example, the scan line changing point P2 is a point where scan line changing should be done in the positive direction until the next scan line changing point P3. Hence, the scan line changing direction at P2 is the positive direction as indicated by an upward arrow (↑) in FIG. 9B. Similarly, the scan line changing direction at P3 is also the positive direction (↑) until the scan line changing point P4. The scan line changing direction at the scan line changing point P4 is the negative direction as indicated by a downward arrow (↓), unlike the preceding direction. As data representing these directions, data representing the positive direction in the sub-scanning direction is held as "1", and that representing the negative direction in the sub-scanning direction is held as "0", as shown in FIG. 9C. In this case, the number of held data equals the number of scan line changing points. If the number of scan line changing points is m, the number of held bits is also m.

Referring back to the description of FIGS. 3A and 3B, scan lines 302 and 304 are actual scan lines which incline or skew owing to the positional precision and eccentricity of the photosensitive body 22, and the positional precisions of the optical systems in the scanner units 24, that is, 24C, 24M, 24Y, and 24K for the respective colors shown in FIG. 2. The image forming apparatus has a different profile characteristic for each printing device (printing engine). In a color image forming apparatus, the profile characteristic is different between colors.

The scan line changing point of an area where the profile characteristic is shifted in the positive direction along the sub-scanning direction will be explained with reference to FIG. 3A. The scan line changing point in the first embodiment is a point where the profile characteristic is shifted by one pixel in the sub-scanning direction. In FIG. 3A, scan line changing points are points P1, P2, and P3 where the upward skew characteristic 302 is shifted by one pixel in the sub-scanning direction. In FIG. 3A, the points P1, P2, and P3 are plotted using P0 as a reference. As is apparent from FIG. 3A, the distance between scan line changing points is short in an area where the skew characteristic 302 changes abruptly, and long in an area where it changes gradually, as represented by distances L1 and L2.

The scan line changing point of an area where the profile characteristic is shifted in the negative direction along the sub-scanning direction will be explained with reference to FIG. 3B. Also in an area representing a downwardly shifted characteristic, the scan line changing point means a point where the profile characteristic is shirted by one pixel in the sub-scanning direction. In FIG. 3B, scan line changing points are points Pn and Pn+1 where the downward skew characteristic 304 is shifted by one pixel in the sub-scanning direction. In FIG. 3B, Pn and Pn+1 are plotted using Pn as a reference. Also in FIG. 3B, similar to FIG. 3A, the distance between scan line changing points is short in an area where the skew characteristic 304 changes abruptly, and long in an area where it changes gradually, as represented by distances Ln and Ln+1.

As described above, the scan line changing point is closely related to the degrees of change of the skew characteristics 302 and 304 of the image forming apparatus. The number of scan line changing points is large in an image forming apparatus having a steep skew characteristic, and small in an image forming apparatus having a gradual skew characteristic.

Since the skew characteristic of the image forming apparatus is different between colors, as described above, the number and positions of scan line changing points are also different between them. The difference between colors appears as a registration error in an image obtained by transferring toner images of all colors onto the intermediate transfer member 28. The present invention is directed to a process at the scan line changing point, and details of this process will be described later with reference to the accompanying drawings.

The process of the image processing section 102 in the color image forming apparatus 100 will be explained with reference to FIG. 1 again.

An image generation unit 104 generates raster image data capable of a printing process from print data received from a computer or the like (not shown), and outputs the raster image data for each pixel as R, G, and B data and attribute data representing the data attribute of each pixel. The image generation unit 104 may also be configured to arrange a reading unit in the color image forming apparatus and process image data from the reading unit instead of image data received from a computer or the like. This reading unit includes at least a CCD (Charge Coupled Device) or CIS (Contact Image Sensor). A processing unit may also be arranged to perform a predetermined image process for read image data. Instead of arranging the reading unit in the color image forming apparatus 100, data may also be received from the reading unit via an interface (not shown).

A color conversion unit 105 converts R, G, and B data into C, M, Y, and K data in accordance with the toner colors of the image forming section 101, and stores the C, M, Y, and K data and attribute data in a bitmap memory or storage unit 106. The storage unit 106 is the first image data storage unit arranged in the image processing section 102, and temporarily stores raster image data subjected to a printing process. The storage unit 106 may also be formed from a page memory which stores image data of one page, or a band memory which stores data of lines.

Halftone processing units 107C, 107M, 107Y, and 107K perform a halftone process for data of the respective colors by using attribute data output from the storage unit 106. As concrete arrangements of the halftone processing unit, there are a halftone processing unit which performs a screen process, and a halftone processing unit which performs an error diffusion process. The screen process is to perform an N-ary process using predetermined dither matrices and input image data. The error diffusion process is to perform an N-ary process by comparing input image data with a predetermined threshold, and diffuse the difference between the input image data and the threshold to peripheral pixels subjected to the N-ary process later.

A storage unit 108 is the second image data storage unit incorporated in the image processing section 102, and stores N-ary data processed by the halftone processing units 107, that is, 107C, 107M, 107Y, and 107K. If the position of a pixel subjected to an image process by processing blocks on the downstream side of the storage unit 108 is a scan line changing point, scan line changing of one pixel is executed when reading out data from the storage unit 108.

Figure 8A:
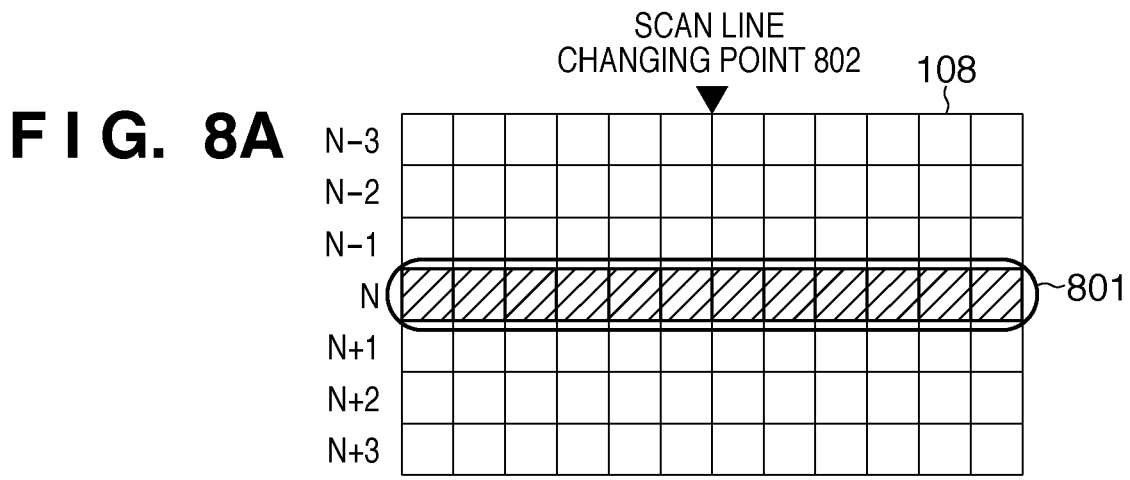
FIGS. 8A to 8C are views for explaining a scan line changing process according to the embodiment of the present invention.

This scan line changing process will be explained with reference to FIGS. 8A to 8C. FIG. 8A is a view schematically showing the state of data held in the storage unit 108. As shown in FIG. 8A, the storage unit 108 stores data processed by the halftone processing unit 107 regardless of the compensation direction of the image processing section 102 or the skew characteristic of the image forming section 101.

Letting N be the line number of a pixel line to be processed, (N−1)th to (N−3)th pixel lines positioned above the Nth pixel line in FIG. 8A are processed before the Nth pixel line. (N+1)th to (N+3)th pixel lines positioned below the Nth pixel line are processed after the Nth pixel line. In FIG. 8A, the Nth pixel line to be processed is surrounded by a line 801. When reading out the pixel line 801, data are shifted at a scan line changing point 802 serving as a boundary by one pixel in the positive or negative direction in accordance with the compensation direction of the image processing section 102. That is, data are read out while being shifted by one pixel at the scan line changing point serving as a boundary.

Figure 8B:
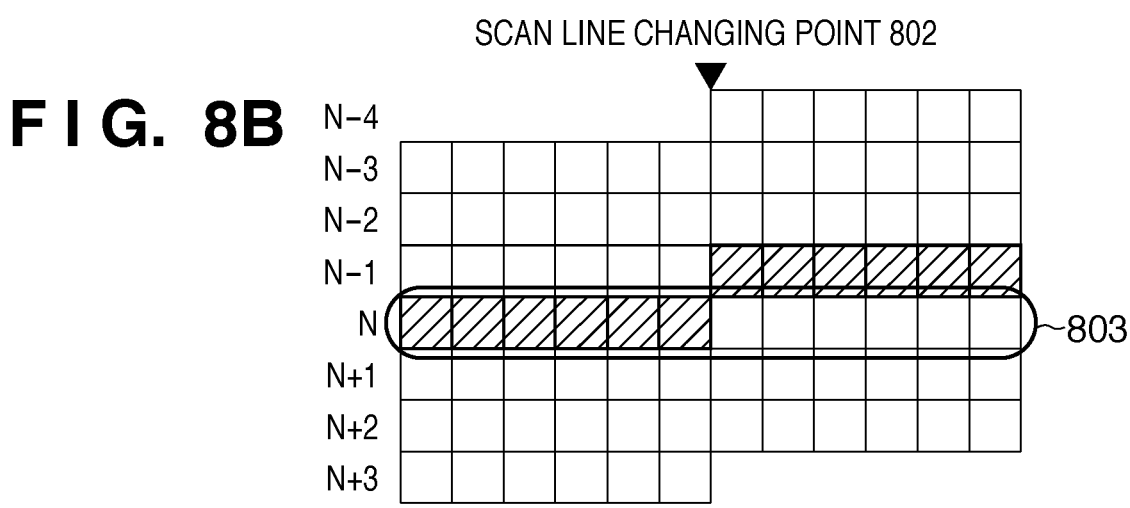

For example, in an area where the profile characteristic is shifted in the positive direction along the sub-scanning direction, data are read out while being shifted by one pixel at the scan line changing point 802 serving as a boundary in a direction in which the line number is decremented, as shown in FIG. 8B. This readout process will be called "upward scan line changing" in the embodiment. As for pixels shifted in the positive direction out of pixels belonging to the pixel line 801 to be processed, each pixel is processed on a preceding line. More specifically, in FIG. 8B, pixels positioned on the right side of the scan line changing point 802 out of pixels on the pixel line 801 are shifted upward by one pixel, and belong to the (N−1)th pixel line. The (N−1)th pixel line is a pixel line processed before the Nth pixel line. To the contrary, pixels positioned on the left side of the scan line changing point 802 out of pixels on the pixel line 801 are directly processed as part of an Nth pixel line 803.

Figure 8C:
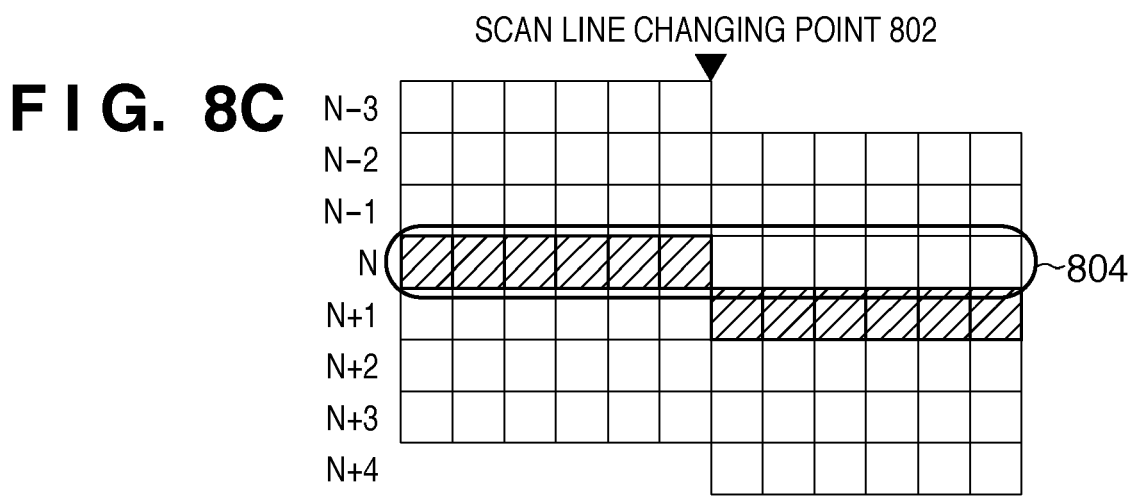

In an area where the profile characteristic is shifted in the negative direction along the sub-scanning direction, data are read out while being shifted by one pixel at the scan line changing point 802 serving as a boundary in a direction in which the line number is incremented, as shown in FIG. 8C. This readout process will be called "downward scan line changing" in the embodiment. As for pixels shifted in the negative direction out of pixels belonging to the pixel line 801 to be processed, each pixel is processed on a succeeding line. More specifically, in FIG. 8C, pixels positioned on the right side of the scan line changing point 802 out of pixels on the pixel line 801 are shifted downward by one pixel, and belong to the (N+1)th pixel line. The (N+1)th pixel line is a pixel line processed after the Nth pixel line. To the contrary, pixels positioned on the left side of the scan line changing point 802 out of pixels on the pixel line 801 are directly processed as part of an Nth pixel line 804.

Referring back to FIG. 1, an attribute correction unit 117 corrects attribute data input via the image generation unit 104, color conversion unit 105, storage unit 106, halftone processing unit 107, and storage unit 108. The attribute correction unit 117 corrects attribute data stored in the storage unit 108, and outputs the corrected attribute data to a subsequent processing unit which determines whether or not to execute an interpolation process of less than one pixel at a pixel of interest. The process in the attribute correction unit 117 is a feature of the first embodiment, and details of this process will be described later.

Interpolation determining units 109C, 109M, 109Y, and 109K determine whether or not the pixel requires interpolation later as a process for pixels before and after a scan line changing point in input N-ary data.

Timing adjusting units 110C, 110M, 110Y, and 110K synchronize N-ary data from the storage unit 108 with the determination results of the interpolation determining units 109. Transfer buffers 111C, 111M, 111Y, and 111K temporarily hold data output from the interpolation determining units 109 and timing adjusting units 110. In the first embodiment, the storage unit 106, storage unit 108, and transfer buffer 111 are separately arranged, but a common storage unit may also be arranged in the image forming apparatus.

Interpolation processing units 112C, 112M, 112Y, and 112K interpolate N-ary data from the transfer buffers 111 on the basis of the determination results of the interpolation determining units 109 that are also transferred from the transfer buffers. Although the determination result from the interpolation determining unit 109 is the result of determination of each pixel, the interpolation process by the interpolation processing unit 112 uses pixels before and after a scan line changing point corresponding to the skew characteristic of the image forming apparatus 100. FIGS. 4A to 4E and 5A to 5E show an interpolation method at a scan line changing point.

FIGS. 4A to 4E are views for explaining an interpolation method when the skew characteristic of the color image forming apparatus 100 is in the positive direction along the sub-scanning direction. FIGS. 5A to 5E are views for explaining an interpolation method when the skew characteristic of the color image forming apparatus 100 is in the negative direction along the sub-scanning direction.

Figure 4A:
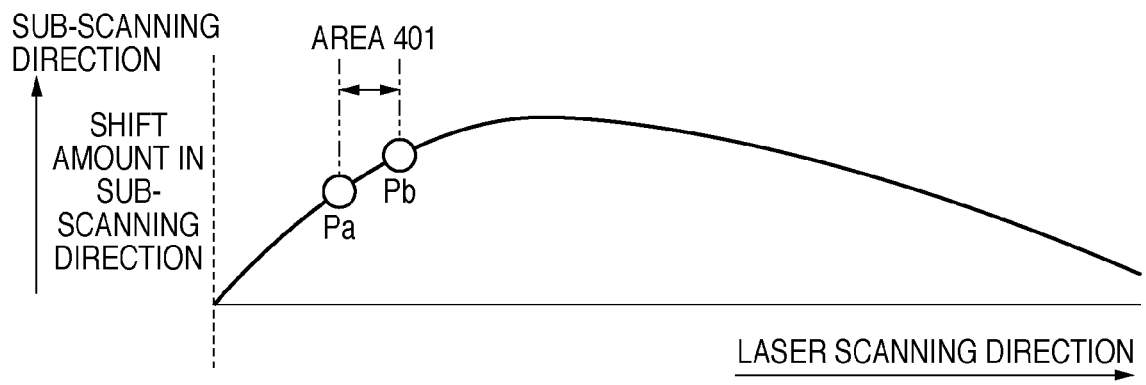
FIGS. 4A to 4E are views for explaining an interpolation method when the skew characteristic of the color image forming apparatus is in the positive direction along the sub-scanning direction according to the embodiment of the present invention.

FIG. 4A is a graph showing the skew characteristic of the color image forming apparatus 100 in the laser scanning direction. An area 401 is an area specified by scan line changing points Pa and Pb, and the shift amount in the sub-scanning direction is in the positive direction along the sub-scanning direction. In this case, the image processing section 102 needs to perform upward compensation in order to cancel the shift in the sub-scanning direction. For descriptive convenience, the minimum interval between scan line changing points is 16 pixels in the following description of the interpolation process, but the present invention is not limited to this. The interval may also be set to an arbitrary number of pixels, or the power of two in order to reduce the circuit arrangement.

Figure 4B:
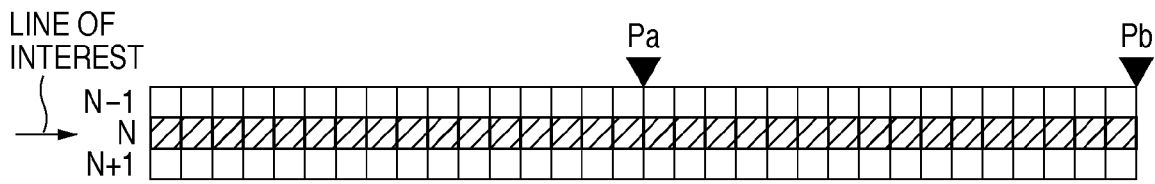
Figure 4C:
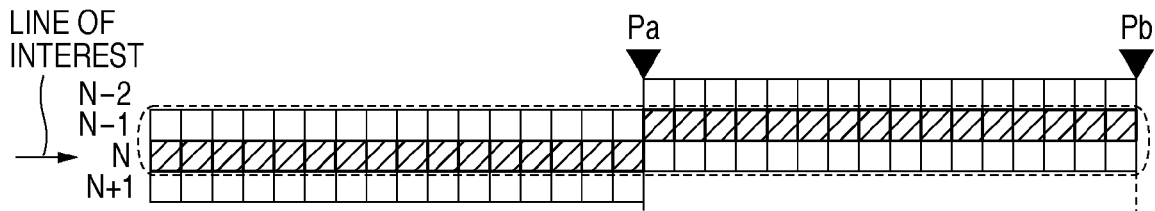

FIG. 4B shows images before and after the scan line changing point Pa before the scan line changing process, that is, shows the arrangement of output image data from the halftone processing unit 107. Assume that the Nth pixel line is the line of interest. FIG. 4C shows the arrangement of image data after the scan line changing process of one pixel when paying attention to the line of interest, that is, the arrangement of image data output from the storage unit 108. FIG. 4C shows an example of compensating pixels positioned on the right side of the scan line changing point Pa upward so as to belong to the (N−1)th pixel line at the scan line changing point Pa serving as a boundary. Since the scan line changing process of one pixel or more is performed when reading out image data from the storage unit 108, the arrangement of pixels before and after the scan line changing point Pa when inputting image data to the interpolation processing unit 112 has a large step at the scan line changing point Pa serving as a boundary.

Figure 4D:
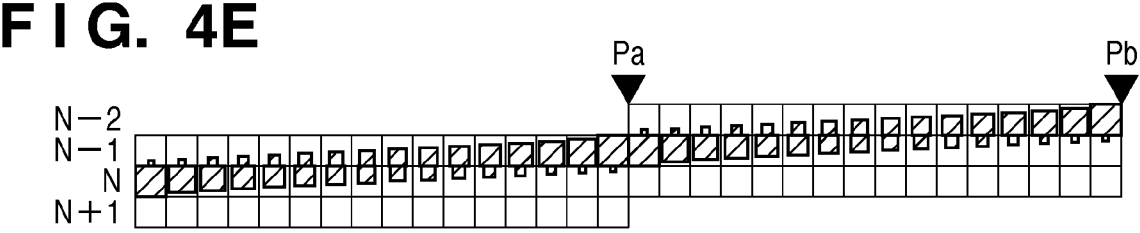

The interpolation processing unit 112 executes the interpolation process for image data appearing as a step on the line of interest. Since the compensation direction in the area 401 is upward, the line of interest is interpolated by weighting calculation between image data of the line of interest and that of a succeeding pixel line. Weighting in this description is to adjust the sum of two target pixels in the sub-scanning direction to 16 in accordance with the minimum value of the scan line changing point, as shown in FIG. 4D. However, the sum of weighting coefficients is not limited to 16.

Figure 6A:
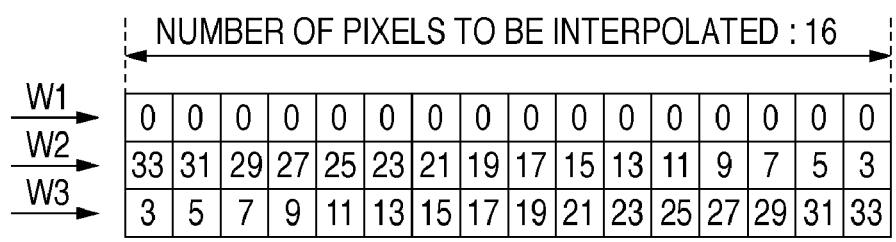
FIGS. 6A to 6D are views showing an example of the arrangement of weighting coefficients according to the embodiment of the present invention.
Figure 6B:
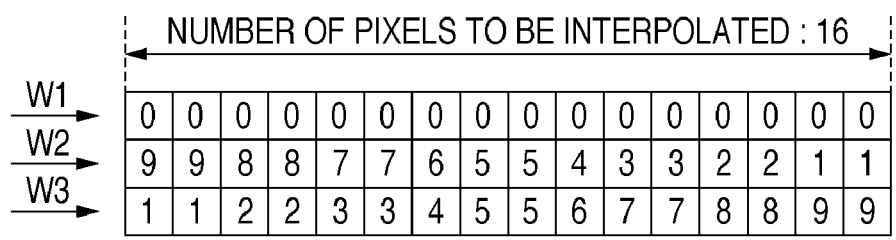

The sum of weighting coefficients may also be set to the power of two in order to reduce the circuit used for calculation, or an arbitrary coefficient may also be used for calculation in order to increase the precision. As the weighting calculation, the weighting coefficient may also be changed for each pixel, which will be described later. Alternatively, a common weighting coefficient may also be used for a plurality of pixels, as shown in FIG. 6A. Further, the number of corresponding pixels may also be changed depending on the value of the weighting coefficient, as shown in FIG. 6B. The scan line changing point is defined as a position where the profile characteristic is shifted by one pixel in the sub-scanning direction along the laser scanning direction. In the following description, the reference position in interpolation is set to the left end.

Equation (1) is used for interpolation:

interpolated pixel value=W1×(pixel value of line immediately preceding to line of interest)+W2×(pixel value of line of interest)+W3×(pixel value of line immediately succeeding to line of interest)    (1)

where W1, W2, and W3 are arbitrary weighting coefficients.

Figure 4E:
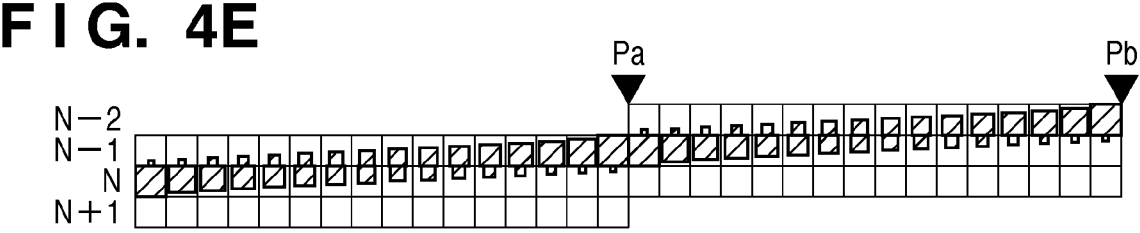

FIG. 4E is a conceptual view of interpolated pixel values obtained by equation (1). FIG. 4E shows interpolated pixel values calculated by setting the Nth, (N−1)th, and (N−2)th pixel lines in FIG. 4C as the pixel of interest. In FIG. 4E, the hatched portion represents the degree of influence of a pixel positioned on the line of interest in FIG. 4B. To make visually grasp the degree of influence easy, it is set to have an area of one pixel for the weight=16, decrease the area as the weight decreases, and set no area for the weight=0.

As is apparent from FIG. 4E, as for pixels on the left side of the scan line changing point Pa, as the pixel is closer to the scan line changing point Pa, it is more strongly influenced by a pixel value on a line succeeding to the pixel of interest by the interpolation based on equation (1). As the pixel is farther from the scan line changing point Pa, it is more strongly influenced by the line of interest, that is, black data line. As for pixels on the right side of the scan line changing point Pa, as the pixel is closer to the scan line changing point Pa, it is more strongly influenced by the line of interest. As the pixel is farther from the scan line changing point Pa, it is more strongly influenced by a line succeeding to the line of interest.

Downward compensation will be explained with reference to FIGS. 5A to 5E. FIG. 5A is a graph showing the skew characteristic of the color image forming apparatus 100 in the laser scanning direction. An area 501 is an area specified by scan line changing points Pc and Pd, and the shift amount in the sub-scanning direction is in the negative direction along the sub-scanning direction. In this case, the image processing section 102 needs to perform downward compensation in order to cancel the shift in the sub-scanning direction. Note that the interval between scan line changing points is the same that in the case of FIGS. 4A to 4E.

FIG. 5B shows images before and after the scan line changing point Pc before the scan line changing process, that is, shows the arrangement of output image data from the halftone processing unit 107. Assume that the Nth pixel line is the line of interest. FIG. 5C shows the arrangement of image data after the scan line changing process of one pixel when paying attention to the line of interest, that is, the arrangement of image data output from the storage unit 108. FIG. 5C shows an example of compensating pixels positioned on the right side of the scan line changing point Pc downward so as to belong to the (N+1)th pixel line at the scan line changing point Pc serving as a boundary. Since the scan line changing process of one pixel or more is performed when reading out image data from the storage unit 108, the arrangement of pixels before and after the scan line changing point Pc when inputting image data to the interpolation processing unit 112 has a large step at the scan line changing point Pc serving as a boundary.

The interpolation processing unit 112 executes the interpolation process for image data appearing as a step on the line of interest. Since the compensation direction in the area 501 is downward, the line of interest is interpolated by weighting calculation between image data of the line of interest and that of a preceding pixel line. Weighting in this description is to adjust the sum of two target pixels in the sub-scanning direction to 16 in accordance with the minimum value of the scan line changing point, as shown in FIG. 5D. However, the sum of weighting coefficients is not limited to 16.

Figure 6C:
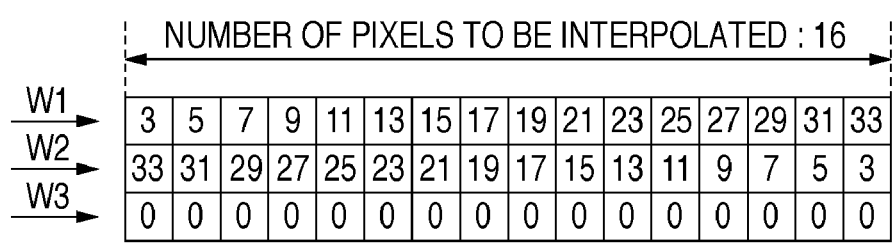
Figure 6D:
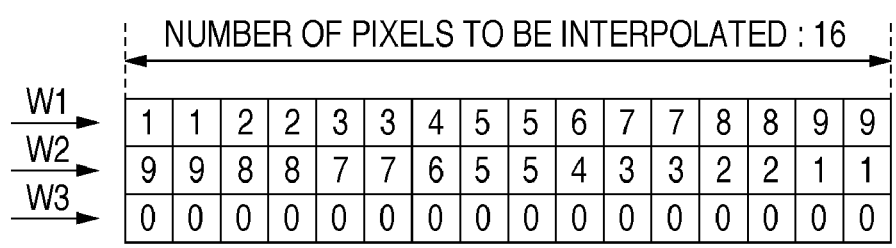

The sum of weighting coefficients may also be set to the power of two in order to reduce the circuit used for calculation, or an arbitrary coefficient may also be used for calculation in order to increase the precision. As the weighting calculation, the weighting coefficient may also be changed for each pixel, which will be described later. Alternatively, a common weighting coefficient may also be used for a plurality of pixels, as shown in FIG. 6C. Further, the number of corresponding pixels may also be changed depending on the value of the weighting coefficient, as shown in FIG. 6D. The scan line changing point is defined as a position where the profile characteristic is shifted by one pixel in the sub-scanning direction along the laser scanning direction. In the following description, the reference position in interpolation is set to the left end.

The above-described equation (1) is also applied to downward compensation to obtain an interpolated pixel value at the scan line changing point Pc serving as a boundary. FIG. 5E is a conceptual view of interpolated pixel values obtained by equation (1). FIG. 5E shows interpolated pixel values calculated by setting the Nth, (N+1)th, and (N+2)th pixel lines in FIG. 5C as the pixel of interest. In FIG. 5E, the hatched portion represents the degree of influence of a pixel positioned on the line of interest in FIG. 5B. To make visually grasp the degree of influence easy, it is set to have an area of one pixel for the weight=16, decrease the area as the weight decreases, and set no area for the weight=0.

More specifically, on the left side of the scan line changing point Pc, as the pixel is closer to the scan line changing point, it is more strongly influenced by a pixel value on a preceding line. As the pixel is farther from the scan line changing point Pc, it is more strongly influenced by the line of interest. As for pixels on the right side of the scan line changing point Pc, as the pixel is closer to the scan line changing point Pc, it is more strongly influenced by the line of interest. As the pixel is farther from the scan line changing point Pc, it is more strongly influenced by a line preceding to the line of interest.

In this way, a large step is prevented from appearing in pixel data successive in the main scanning direction owing to a scan line changing process step larger than one pixel upon the interpolation process of the interpolation processing unit 112 regardless of whether the interpolation direction is upward or downward.

PWMs (Pulse Width Modulators) 113C, 113M, 113Y, 113K convert image data of the respective colors output from the interpolation processing units 112 into the exposure times of scanner units 114C, 114M, 114Y, and 114K. Printing units 115C, 115M, 115Y, 115K of the image forming section 101 output the converted image data.

Profile characteristic data described above with reference to FIGS. 9A to 9C are held in the image forming section 101 as the characteristics of the color image forming apparatus 100. The image processing section 102 executes a process in accordance with the profile characteristics (profiles 116C, 116M, 116Y, and 116K) held in a profile storage unit 103 of the image forming section 101.

The feature of the present invention will be explained in more detail with reference to FIG. 10. FIG. 10 shows an example of the structure of a pixel output from the halftone processing unit 107. Data 1000 which forms one pixel is made up of a total of 40 bits. Each of attribute data 1001, and C, M, Y, and K color pixel data 1002, 1003, 1004, and 1005 is made up of eight bits. The attribute data 1001 contains four bits of significant data, and four spare bits. The significant data contains data of the least significant bit (LSB) representing the character attribute, and data of the second lowest bit representing the thin line attribute. Further, a bit immediately preceding to the bit representing the thin line attribute is data representing the image attribute, and a bit preceding to this bit, i.e., the third bit counted from the least significant bit is data representing the copy forgery-inhibited pattern attribute.

The correlation between a bit value representing each attribute, and the attribute is significant for "1". That is, when the value of the least significant bit is "1", pixel data having this attribute value is character data. Note that the structure of one pixel data 1000 is not limited to one shown in FIG. 10. Data representing each color may also be made up of 10 bits, or the bit structure of the attribute data 1001 may also be reduced or expanded. As for the logic of each bit of the attribute data 1001, "0" may also represent "significant".

As shown in FIG. 10, one pixel data 1000 is made up of the attribute data 1001 and the pixel data 1002 to 1005 of the respective colors, so the attribute data 1001 itself is subordinate not to each color data but to the entire pixel. The attribute data 1001 is not subordinate to each color in order to minimize the number of signal lines connecting the internal processors of the color image forming apparatus 100, e.g., the image generation unit 104 and color conversion unit 105, and prevent an increase in the circuit area (circuit scale) of the wiring area.

The process contents of the attribute correction unit 117 will be described in more detail. First, an interpolation process of less than one pixel at a scan line changing point when the attribute correction unit 117 does not correct the attribute data 1001 will be explained. FIGS. 11A to 11D, 12A to 12E, and 13A to 13E are views for explaining the process contents of the interpolation determining unit 109 to interpolation processing unit 112 in the image processing section 102.

Figure 11A:
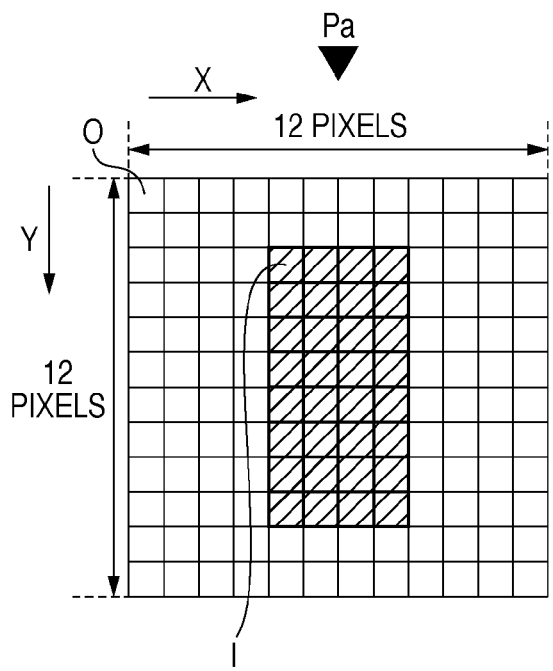
FIGS. 11A to 11D are views for explaining the relationship between image data and attribute data according to the embodiment of the present invention.

For convenience of the following description, rectangular data represents a pixel, and image data centered on a scan line changing point is image data made up of 12 pixels in the main scanning direction and 12 pixels in the sub-scanning direction, as shown in FIG. 11A. The main scanning direction is the X direction, and the sub-scanning direction is the Y direction. A pixel O is defined as the origin (X,Y)=(0,0) in this description, and the scan line changing point Pa is set as the center of image data in the X direction. That is, the scan line changing point Pa is set at the boundary between the sixth and seventh pixels in the X direction. In this manner, the scan line changing point exists at the center of the image data shown in FIG. 11A. Thus, if the profile characteristic is shifted in the positive direction along the sub-scanning direction at the scan line changing point Pa serving as a boundary, the profile characteristic is as shown in FIG. 11C. If the profile characteristic is shifted in the negative direction, it is as shown in FIG. 11D.

Among pixels, a white rectangular pixel represents pixel data of a background color, and for example, is a magenta background pixel in the first embodiment. A shaded rectangular pixel is a character pixel, and for example, is cyan character data in the first embodiment.

Figure 11B:
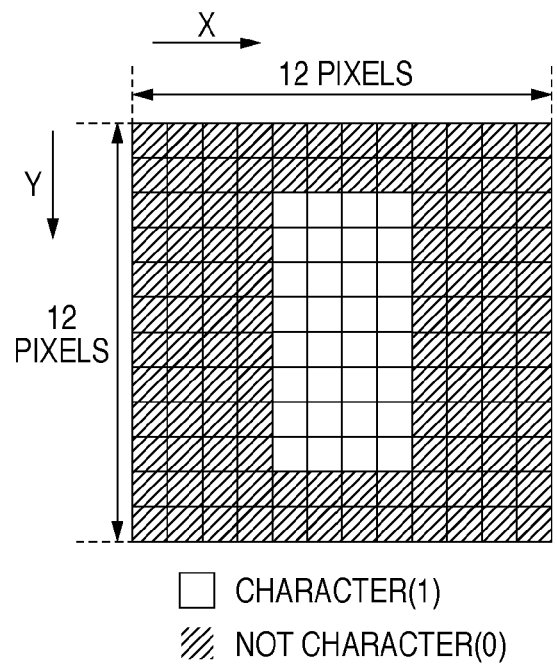
Figure 11C:
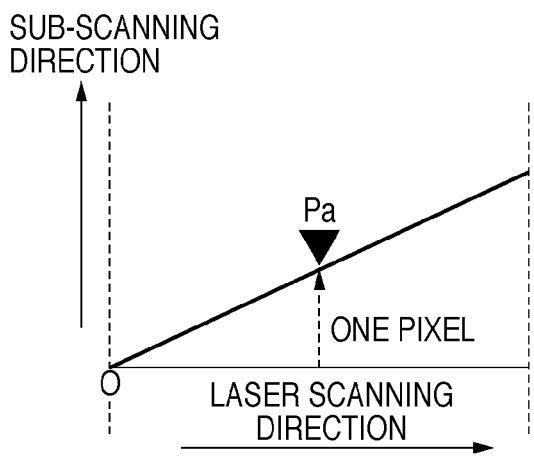
Figure 11D:
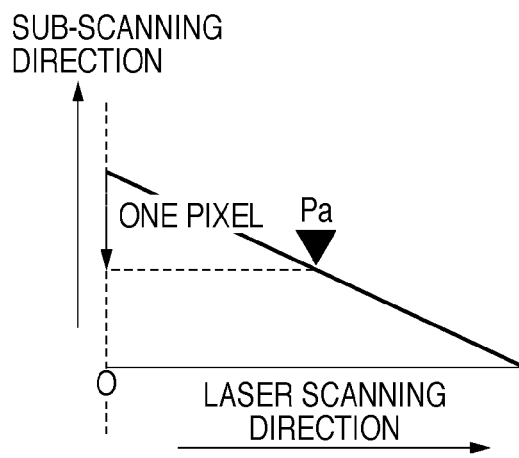

FIG. 11B schematically shows an example of the attribute data 1001 corresponding to the image data in FIG. 11A. In FIG. 11B, the character attribute value out of the attribute data 1001 is written in accordance with the array of pixels. Since shaded pixels are character data in the image data of FIG. 11A, they are represented in FIG. 11B, by white pixels as character pixels, and the remaining pixels are shaded as non-character pixels.

A case where an interpolation process of less than one pixel is executed at the scan line changing point Pa for the image data shown in FIG. 11A will be explained. FIGS. 12A to 12E are views showing a pixel arrangement when upward scan line changing is done at the scan line changing point Pa. In FIGS. 12A to 12E, the process will be explained using image data of four upper lines out of the image data in FIG. 11A for descriptive convenience.

Figure 12B:
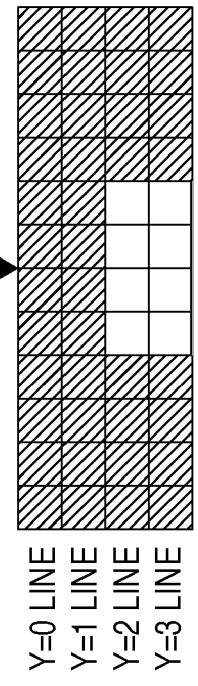
FIGS. 12A to 12E are views for explaining an example of the interpolation effect when no attribute information is enlarged in the sub-scanning direction according to the first embodiment of the present invention.
Figure 12D:
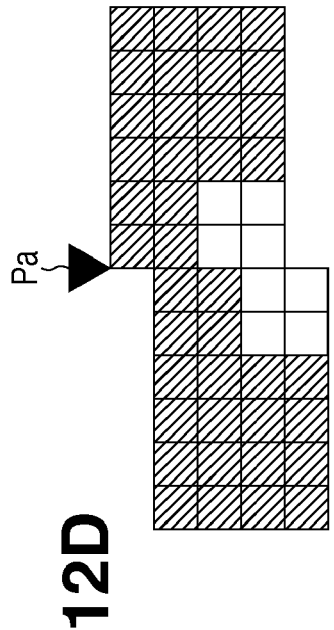
Figure 12A:
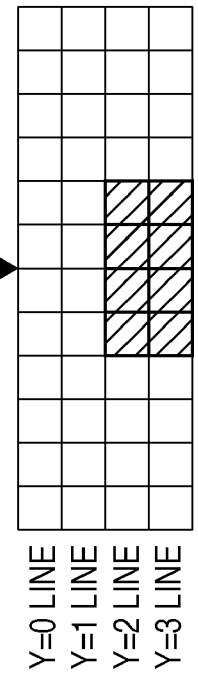
Figure 12C:
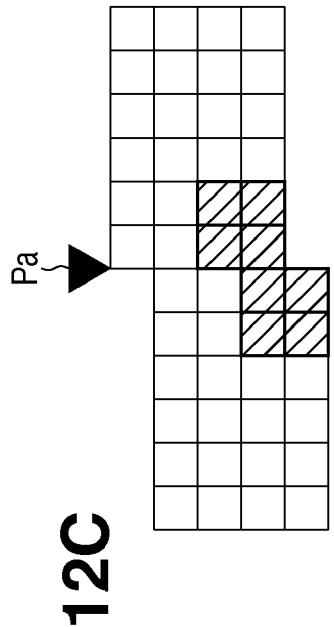

FIG. 12A is a view showing image data of four upper lines before scan line changing. FIG. 12B shows image data obtained by writing the character attribute value out of the attribute data 1001 in accordance with the array of pixels. When the profile characteristic is shifted in a direction shown in FIG. 11C, image data at the scan line changing point Pa serving as a boundary changes to one shown in FIG. 12C by a scan line changing process of more than one pixel read out from the storage unit 108. FIGS. 12A to 12E show a case where the attribute correction unit 117 does not perform any correction process. Thus, attribute data is input to the interpolation determining unit 109 after shifted in the same direction as that of image data, as shown in FIG. 12D.

As described above, when image data is character data, an interpolation process of less than one pixel at a scan line changing point is indispensable. Hence, the interpolation determining unit 109 determines whether or not to execute interpolation of less than one pixel by the interpolation processing unit 112 serving as a subsequent processing unit in accordance with the value represented by input character attribute data. In the example of FIG. 12D, the interpolation determining unit 109 determines that pixels at pixel coordinates (4, 2), (5, 2), (6, 2), (7, 2), (4, 3), (5, 3), (6, 3), and (7, 3) are subjected to the interpolation process of less than one pixel.

The interpolation processing unit receives image data input via the timing adjusting unit 110 and transfer buffer 111, and the interpolation determination result of the interpolation determining unit 109. Based on the determination by the interpolation determining unit 109, the interpolation processing unit 112 executes the interpolation process according to the interpolation processing method shown in FIGS. 4A to 4E for the pixels at coordinates (4, 2), (5, 2), (6, 2), (7, 2), (4, 3), (5, 3), (6, 3), and (7, 3) at which the character attribute is significant. Details of the interpolation method such as the weighting coefficient of the interpolation process have already been described, and a description thereof will not be repeated.

Figure 12E:
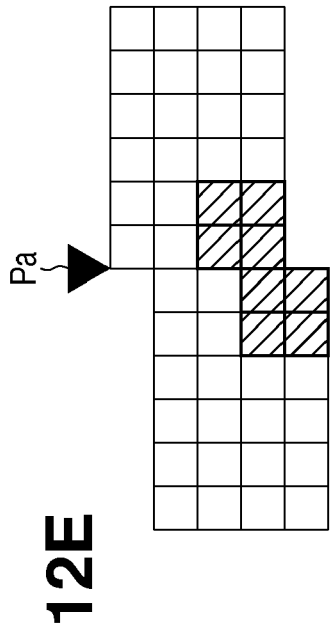

FIG. 12E shows the result of performing the interpolation process for target pixels. Since pixels at which the character attribute is significant coincide with input pixel data, as shown in FIG. 12E, pixel data obtained as a result of the interpolation process are identical to those obtained when performing no compensation process of less than one pixel.

FIGS. 13A to 13E are views showing a pixel arrangement when downward scan line changing is done at the scan line changing point Pa. Also in FIGS. 13A to 13E, similar to FIGS. 12A to 12E, the process will be explained using image data of four lower lines out of the image data in FIG. 11A for descriptive convenience. When the profile characteristic is shifted in a direction shown in FIG. 11D, image data at the scan line changing point Pa serving as a boundary changes to one shown in FIG. 13C by a scan line changing process of more than one pixel read out from the storage unit 108. In order to explain a case where the attribute correction unit 117 does not perform any correction process, attribute data is input to the interpolation determining unit 109 after shifted in the same direction as that of image data, as shown in FIG. 13D.

When image data is character data, an interpolation process of less than one pixel at a scan line changing point is indispensable even if downward scan line changing is done at a scan line changing point. Hence, the interpolation determining unit 109 determines whether or not to execute interpolation of less than one pixel by the interpolation processing unit 112 serving as a subsequent processing unit in accordance with the value represented by input character attribute data. In the example of FIG. 13D, the interpolation determining unit 109 determines that pixels at pixel coordinates (4, 8), (5, 8), (6, 8), (7, 8), (4, 9), (5, 9), (6, 9), and (7, 9) are subjected to the interpolation process of less than one pixel.

The interpolation processing unit receives image data input via the timing adjusting unit 110 and transfer buffer 111, and the interpolation determination result of the interpolation determining unit 109. Based on the determination by the interpolation determining unit 109, the interpolation processing unit 112 executes the interpolation process according to the interpolation processing method shown in FIGS. 5A to 5E for the pixels at coordinates (4, 8), (5, 8), (6, 8), (7, 8), (4, 9), (5, 9), (6, 9), and (7, 9) at which the character attribute is significant. Details of the interpolation method such as the weighting coefficient of the interpolation process have already been described, similar to upward interpolation, and a description thereof will not be repeated.

FIG. 13E shows the result of performing the interpolation process for target pixels. Since pixels at which the character attribute is significant coincide with input pixel data, as shown in FIG. 13E, pixel data obtained as a result of the interpolation process are identical to those obtained when performing no compensation process of less than one pixel.

As shown in FIGS. 12E and 13E, when the positions of pixel attribute data and pixel data coincide with each other even if pixel data exist over the scan line changing point Pa and the character attribute data of the pixels are significant, an interpolation process of less than one pixel by the interpolation processing methods shown in FIGS. 4A to 4E and 5A to 5E cannot be executed.

For this reason, the attribute correction unit 117 corrects input attribute data. That is, the attribute correction unit 117 corrects pixel attribute data necessary to perform determination by the interpolation determining unit 109, so as to properly execute a compensation process of less than one pixel at the scan line changing point Pa by applying the interpolation methods shown in FIGS. 4A to 4E and 5A to 5E.

An attribute correction method by the attribute correction unit 117 will be explained with reference to FIGS. 14A to 14E, 15A to 15E, and 16. FIGS. 14A to 14E are views for explaining an attribute correction method when the profile characteristic is shifted in the positive direction and upward scan line changing is done. FIGS. 15A to 15E are views for explaining an attribute correction method when the profile characteristic is shifted in the negative direction and downward scan line changing is done. FIG. 16 is a flowchart showing the sequence of a process to execute the attribute correction method and interpolation process by a configuration made up of the attribute correction unit 117 to the interpolation processing unit 112.

In the first embodiment, the correction contents of the attribute correction unit 117 aim to apply the interpolation process by the interpolation processing unit 112 to even pixels 1402 and 1403 or 1502 and 1503 having a non-character attribute in the sub-scanning direction.

In step S1601 of FIG. 16, it is determined based on attribute data whether or not to execute the interpolation process. More specifically, it is determined whether attribute data input to the attribute correction unit 117 has a value (character attribute "1") representing the necessity of the interpolation process at a scan line changing point. If the interpolation process is necessary ("YES" in step S1601), the process shifts to step S1602 to enlarge the attribute data by one pixel in the sub-scanning direction. If no interpolation process is necessary ("NO" in step S1601), the process of this flowchart ends.

In step S1602, the scan line changing direction is determined. If upward scan line changing is necessary because the profile characteristic is shifted in the positive direction ("upward" in step S1602), the process shifts to step S1603. If downward scan line changing is necessary because the profile characteristic is shifted in the negative direction ("downward" in step S1602), the process shifts to step S1604.

Figure 14A:
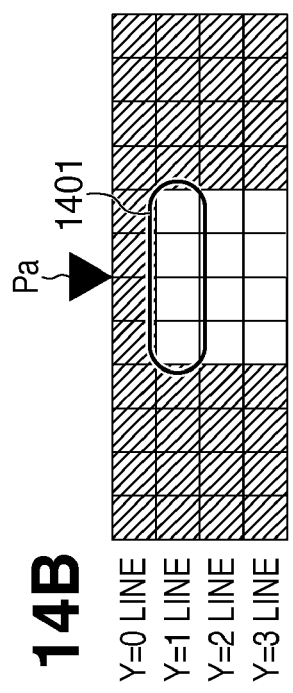
FIGS. 14A to 14E are views for explaining an example of the interpolation effect when attribute information is enlarged in the sub-scanning direction according to the first embodiment of the present invention.
Figure 14C:
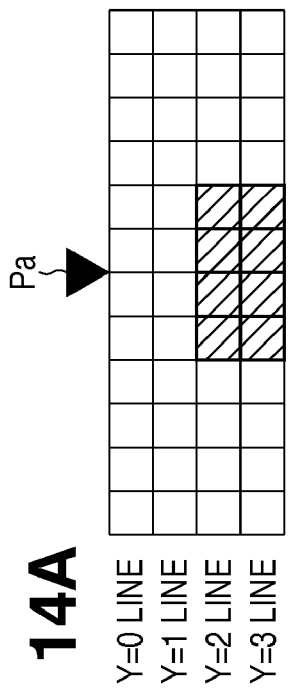
Figure 14B:
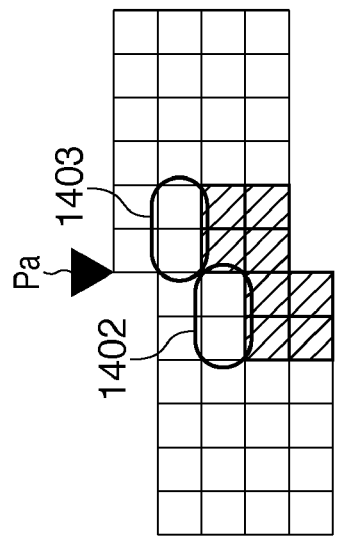
Figure 14D:
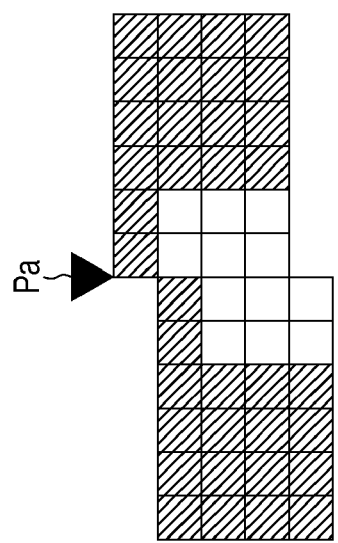

In step S1603, the attribute data is enlarged upward. This process will be described in more detail with reference to FIGS. 14A to 14E. When image data as shown in FIG. 14A exists, the non-character attribute and character attribute are generally arrayed as shown in FIG. 12B. According to the first embodiment, attribute data is enlarged by correcting attribute data in an area 1401 in FIG. 14B from the non-character attribute to the character attribute. The pixels 1402 and 1403 in FIG. 14C determined based on the corrected attribute data are subjected to the interpolation process.

Figure 14E:
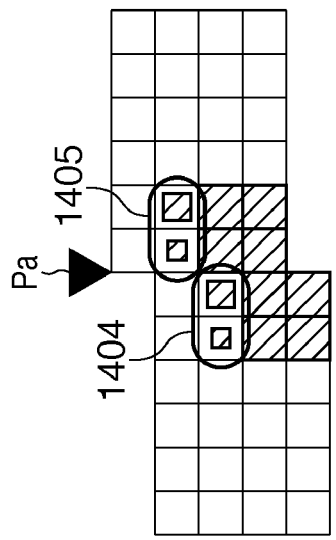

In step S1605, an interpolation process for upward scan line changing is executed. Details of the interpolation process have been described with reference to FIGS. 4A to 4E. As a result of the interpolation process, interpolated pixel values 1404 and 1405 in FIG. 14E are obtained, ensuring the continuity near the scan line changing point Pa. After that, the process ends.

In step S1604, the attribute data is enlarged downward. This process will be described in more detail with reference to FIGS. 15A to 15E. When image data as shown in FIG. 15A exists, the non-character attribute and character attribute are generally arrayed as shown in FIG. 13B. According to the first embodiment, attribute data is enlarged by correcting attribute data in an area 1501 in FIG. 15B from the non-character attribute to the character attribute. The pixels 1502 and 1503 in FIG. 15C determined based on the corrected attribute data are subjected to the interpolation process.

In step S1606, an interpolation process for downward scan line changing is executed. Details of the interpolation process have been described with reference to FIGS. 5A to 5E. As a result of the interpolation process, interpolated pixel values 1504 and 1505 in FIG. 15E are obtained, ensuring the continuity near the scan line changing point Pa. After that, the process ends.

In the above description, the attribute requiring an interpolation process of less than one pixel by the interpolation processing unit 112 is the character attribute. However, the present invention is not limited to this. That is, the interpolation process can target any attribute requiring it at a scan line changing point serving as a boundary in order to improve the quality of a printout image. For example, the interpolation process can target an attribute representing pattern images successive in the main scanning direction, such as a thin line image.

The configuration which executes the above-described contents is not limited to the hardware configuration. That is, a software process can also implement a processing unit complying with these contents.

As described above, according to the first embodiment, attribute information accessory to a pixel can be used to determine whether to execute an interpolation process of less than one pixel at a scan line changing point in color misregistration compensation for a printout from an image forming apparatus having a characteristic shifted in the laser scanning direction for each color. When the attribute information is an attribute representing execution of the interpolation process of less than one pixel, it is enlarged in the sub-scanning direction. With these two features, the first embodiment can reduce an error in determining whether to execute an interpolation process of less than one pixel, and execute a smooth interpolation process for pixels before and after a scan line changing point.

Second Embodiment

In the first embodiment, attribute data is corrected to apply an interpolation process of less than one pixel to pixels before and after a scan line changing point serving as a boundary. Even in this case, another problem arises. The second embodiment which solves the problem of the first embodiment will be described.

In the first embodiment, when an interpolation process of less than one pixel is necessary at a scan line changing point, attribute data corresponding to image data as shown in FIG. 11B is enlarged in the shift direction. In this case, however, only attribute data is enlarged, and no image data is reflected. As described above, attribute data is accessory not to color data but to a pixel.

When image data in FIG. 11A is exemplified, attribute data representing a character is enlarged for cyan character image data (shaded display data) so as to more preferably perform an interpolation process of less than one pixel for the cyan color component. However, the enlargement of the attribute data influences even data which are originally background pixels in terms of the magenta background (white display pixels) and do not require the interpolation process by an interpolation processing unit 112 before and after a scan line changing point. That is, even the magenta color component undergoes the interpolation process before and after a scan line changing point.

In a printout image, color misregistration in the sub-scanning direction most influences the image quality. If pixels before and after a scan line changing point undergo the interpolation process based on the profiles 116 stored in the image forming section 101 as if the profile characteristic were shifted though the profile characteristic is not shifted in practice, the unnecessary interpolation process causes color inconsistency.

Figure 17:
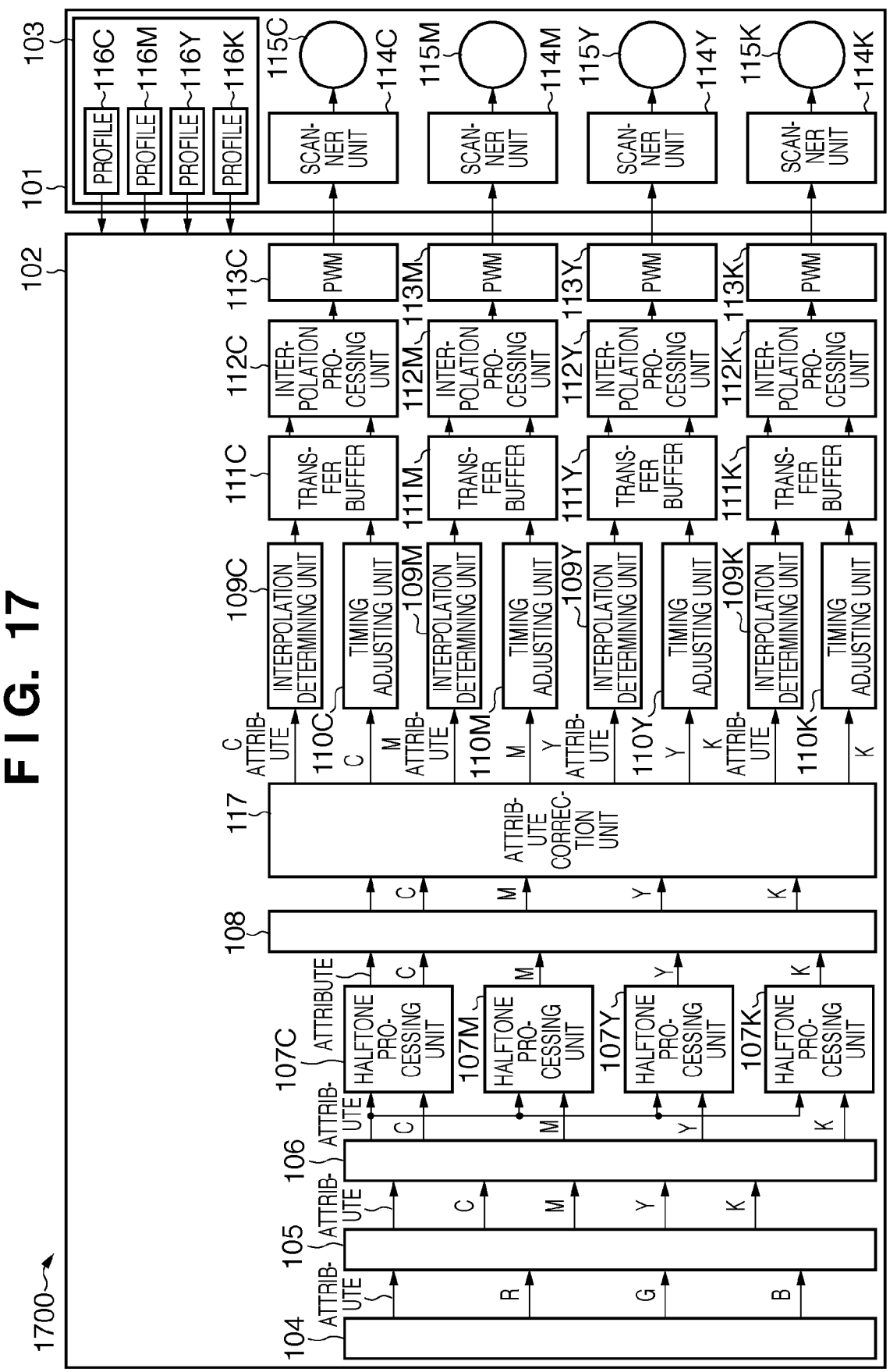
FIG. 17 is a block diagram showing an example of the internal arrangement of a color image forming apparatus according to the second embodiment of the present invention.

The second embodiment solves this problem, and will be described in detail below. FIG. 17 is a block diagram showing an example of the arrangements of blocks associated with formation of an electrostatic latent image in an electrophotographic color image forming apparatus 1700 according to the second embodiment. In FIG. 17, the same reference numerals as those used in the description of the first embodiment denote processing units implementing the same functions as those in FIG. 1. From a comparison between FIGS. 1 and 17, no processing unit is newly added in the second embodiment. However, according to the difference between FIGS. 1 and 17, an attribute correction unit 117 acquires attribute data, and C, M, Y, and K color image data from a storage unit 108. The attribute correction unit 117 outputs not common attribute data (first attribute data), but individual attribute data (second attribute) for each color component to an interpolation determining unit 109 of each color.

More specifically, a feature of the second embodiment is to generate attribute data for each color component by the attribute correction unit 117 in addition to the process to enlarge input attribute information.

Figure 18D:

FIGS. 18A to 18E are views for explaining an example of attribute information inheritance conditions according to the second embodiment. FIG. 18A is a view showing an example of a pixel structure according to the second embodiment. Data 1800 which forms one pixel is made up of a total of 40 bits. Each of attribute data 1801, and C, M, Y, and K color image data 1802, 1803, 1804, and 1805 is made up of eight bits. The least significant bit (LSB) of the attribute data 1801 is data representing the character attribute.

In FIG. 18A, each pixel is made up of 40 bits, similar to the structure shown in FIG. 10. However, the embodiment of the present invention is not limited to the pixel structure having this bit count. In the following description, the character attribute is significant ("1"). However, the present invention is also similarly applied to a case where an attribute requiring an interpolation process of less than one pixel other than the character attribute is significant ("1").

A method of correcting an attribute to be output to the interpolation determining unit 109 of each color on the basis of the C, M, Y, and K pixel values of a pixel at which the character attribute is significant ("1") will be described below. FIGS. 18B to 18E are graphs for explaining an example of the character attribute value of each pixel that is assigned based on the relationship between the densities of C, M, Y, and K pixel data and the threshold. In FIGS. 18B to 18E, the abscissa axis represents C, M, Y, and K color components, and the ordinate axis represents the density. A first threshold TH1, second threshold TH2, and third threshold TH3 are set in advance for the color image forming apparatus 1700.

FIG. 18B is a graph for explaining a case where only one color component exceeds the threshold, and the three remaining color components are lower than the threshold. For example, FIG. 18B shows a case where the C color component value exceeds the maximum threshold TH1. The K, M, and Y color component values are lower than the minimum threshold TH3.

When only one color component exceeds the threshold, the attribute correction unit 117 determines that the character attribute accessory to a pixel is accessory to only one color component. In the case of FIG. 18B, the attribute correction unit 117 determines that the character attribute is accessory to the C color component value. The attribute correction unit 117 enlarges the attribute information in the sub-scanning direction, and outputs the enlarged attribute information as a significant value to only the interpolation determining unit 109 of this color component (in the case of FIG. 18B, an interpolation determining unit 109C). The attribute correction unit 117 neither enlarges attribute information in the sub-scanning direction, nor outputs character attribute information accessory to a pixel as a significant value to the interpolation determining units 109 of the remaining color components (in the case of FIG. 18B, interpolation determining units 109M, 109Y, and 109K).

It is apparent from the configuration of the interpolation process that the influence of interpolation of less than one pixel is larger for a larger density value. It is, therefore, effective to distribute character attribute data accessory to a pixel to the interpolation determining units 109 of the respective colors in accordance with determinations based on the thresholds TH1, TH2, and TH3. This can be easily dealt with without greatly changing the wiring area or circuit scale because attribute information input from the image generation unit 104 to the attribute correction unit 117 is kept accessory not to each color but to a pixel.

FIG. 18C is a graph for explaining a case where a secondary color, i.e., two color components exceed a predetermined threshold, and the two remaining color components are lower than the threshold. In FIG. 18C, for example, the C color component value exceeds the threshold TH1 and the M color component value exceeds the threshold TH2. In this case, the attribute correction unit 117 determines that the character attribute accessory to a pixel represents a secondary color. The attribute correction unit 117 enlarges the attribute information in the sub-scanning direction, and outputs significant data as attribute data to only the interpolation determining units 109 of the C and M color components. Since the K and Y color components are lower than the minimum threshold TH3, the attribute correction unit 117 neither outputs significant attribute data to the K and interpolation determining units 109, nor enlarges attribute information in the sub-scanning direction.

FIG. 18D is a graph for explaining a case where three color components exceed a predetermined threshold. In FIG. 18D, for example, the C, M, and Y color component values exceed the threshold. The C color component exceeds the intermediate threshold TH2, and the M and Y color components exceed the minimum threshold TH3. In this case, the threshold used to assign the character attribute accessory to a pixel can be adjusted for each color image forming apparatus 1700. Even if color components exceed the third threshold TH3, the character attribute accessory to a pixel need not be assigned to all these color components.

That is, in FIG. 18D, if the threshold TH2 serves as a criterion, significant attribute data enlarged in the sub-scanning direction is assigned to the interpolation determining unit 109C of the C color component. If the threshold TH3 serves as a criterion, significant attribute data enlarged in the sub-scanning direction is assigned to the interpolation determining units 109C, 109M, and 109Y of the C, M, and Y color components.

Figure 18E:
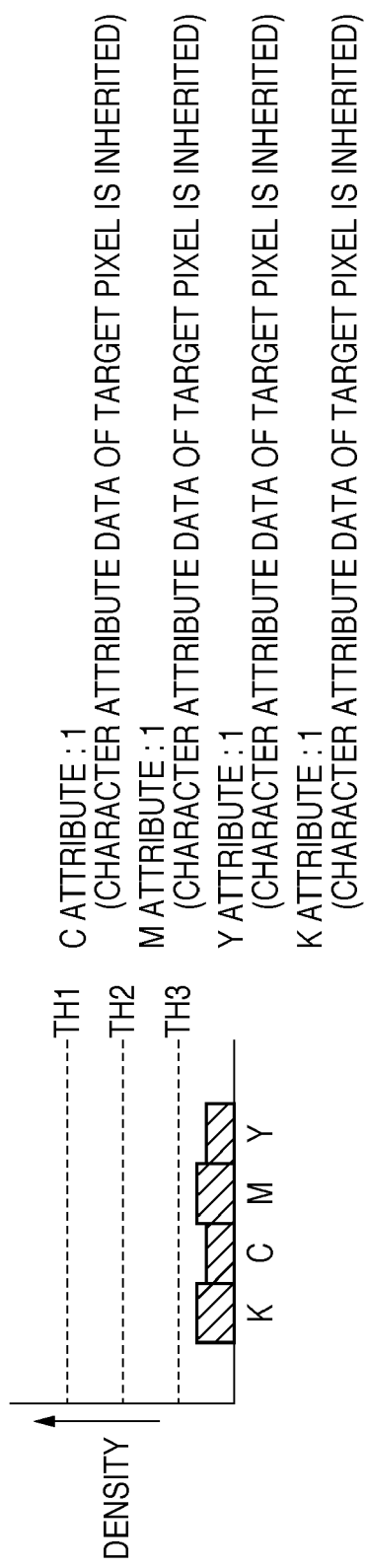

FIG. 18E is a graph for explaining a case where all the color components are lower than the minimum threshold TH3. In this case, no color component exceeds a predetermined threshold, so the character attribute accessory to a pixel need not be distributed to any color component according to the above description. However, information of an original accessory character attribute will be omitted, so the character attribute is distributed to all the color components.

However, the case where all the color components are lower than a predetermined threshold is not limited to the above description. For example, when the set density value of the threshold TH3 is excessively low, it is also possible to determine that the influence of an interpolation process of less than one pixel is very small near a scan line changing point, and output character attribute information of all the color components as insignificant data.

Figure 19:
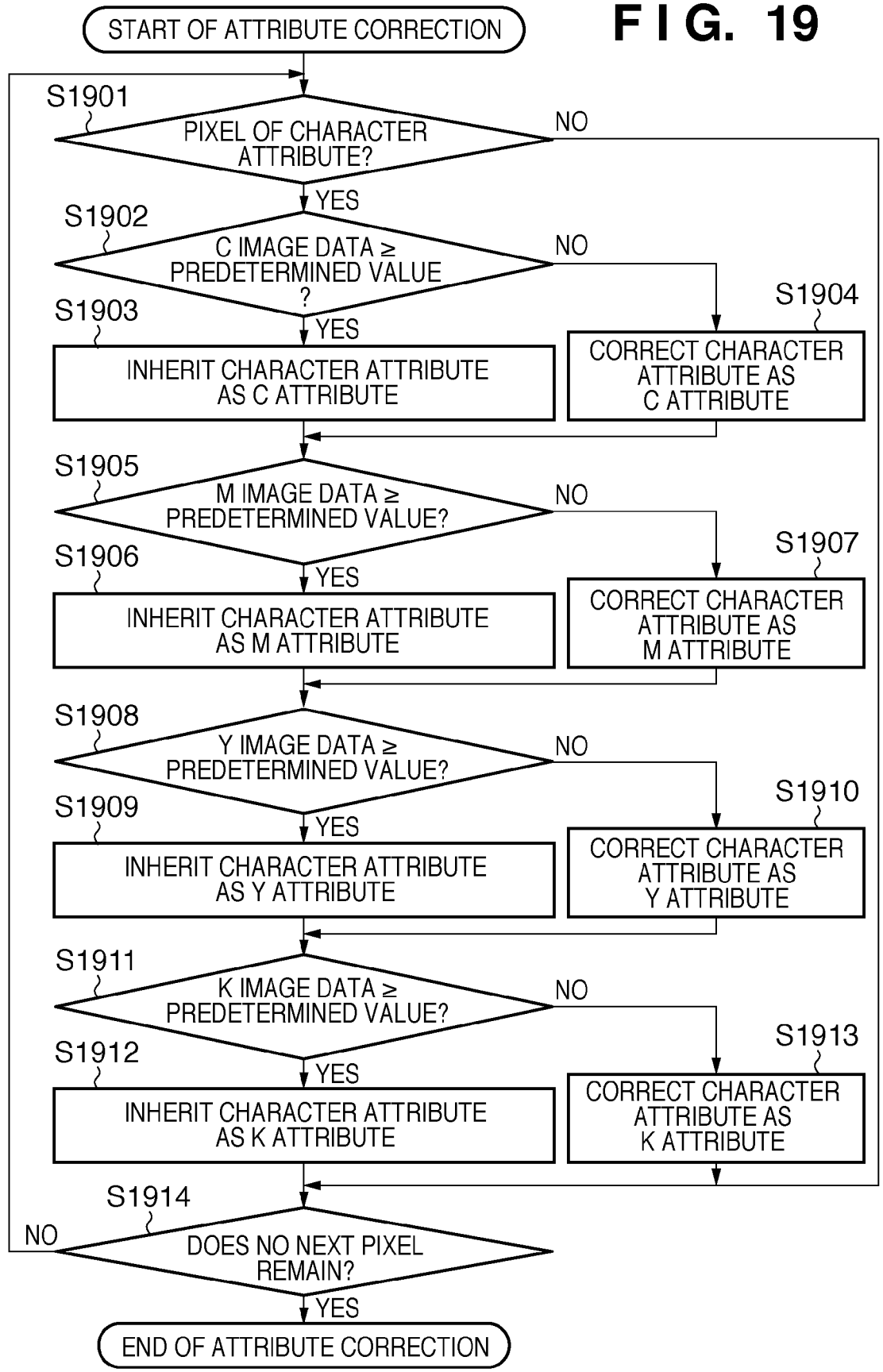
FIG. 19 is a flowchart of a process according to the second embodiment of the present invention.
Figure 22A:
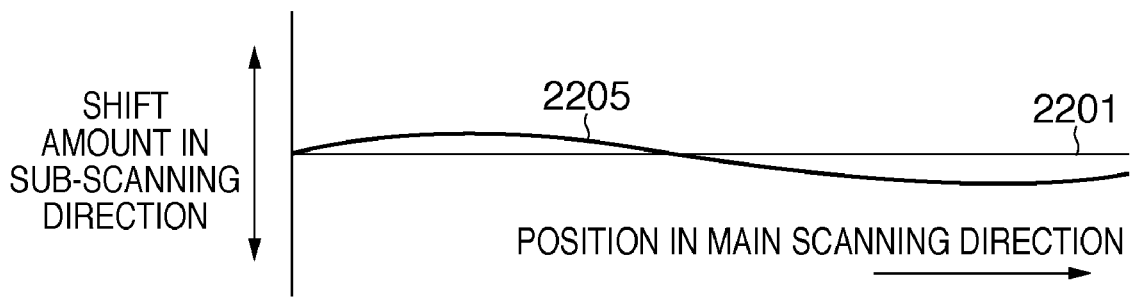
FIGS. 22A to 22D are graphs for explaining a conventional technique.
Figure 22B:
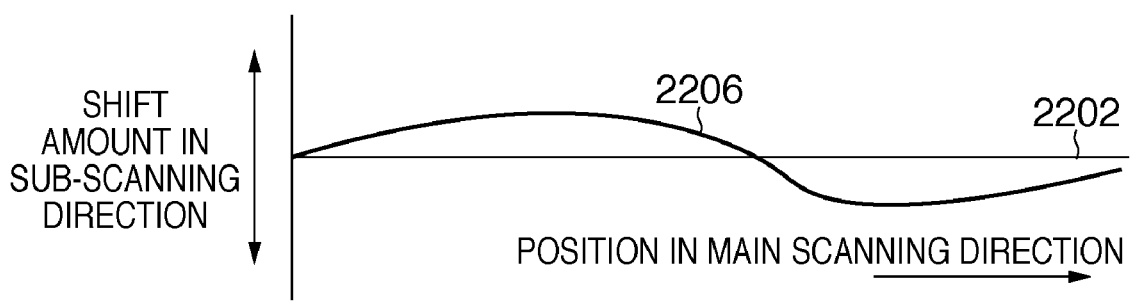
Figure 22C:
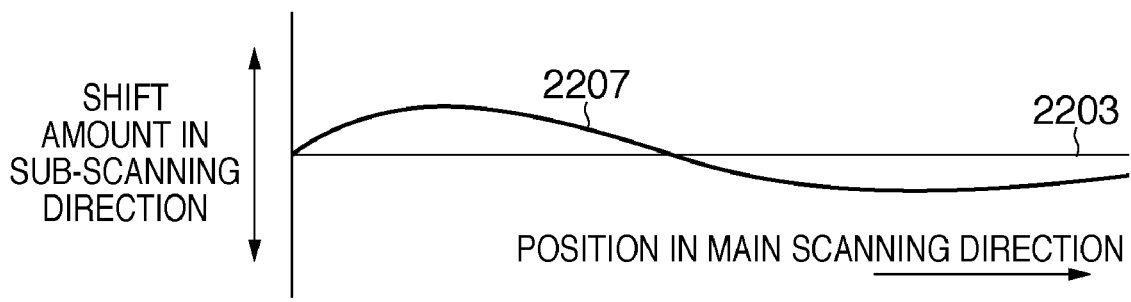
Figure 22D:
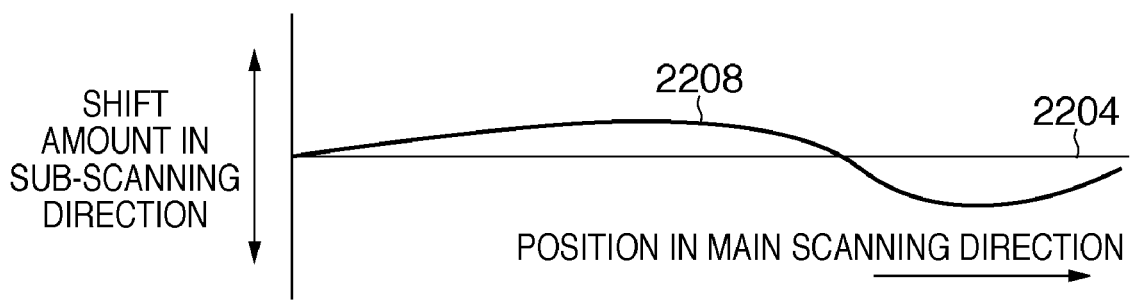
Figure 23A:
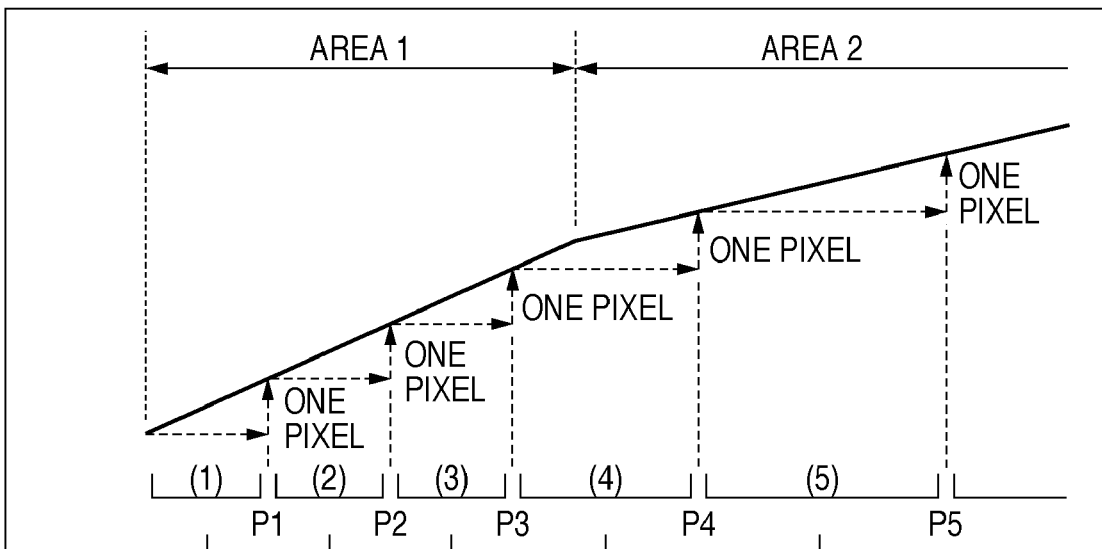
FIGS. 23A to 23C are views for explaining the conventional technique.
Figure 23B:
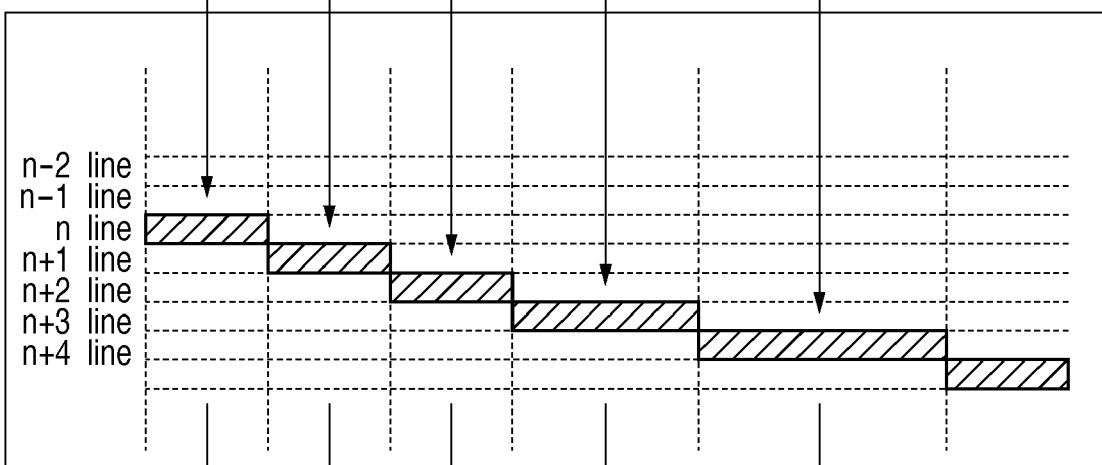
Figure 23C:
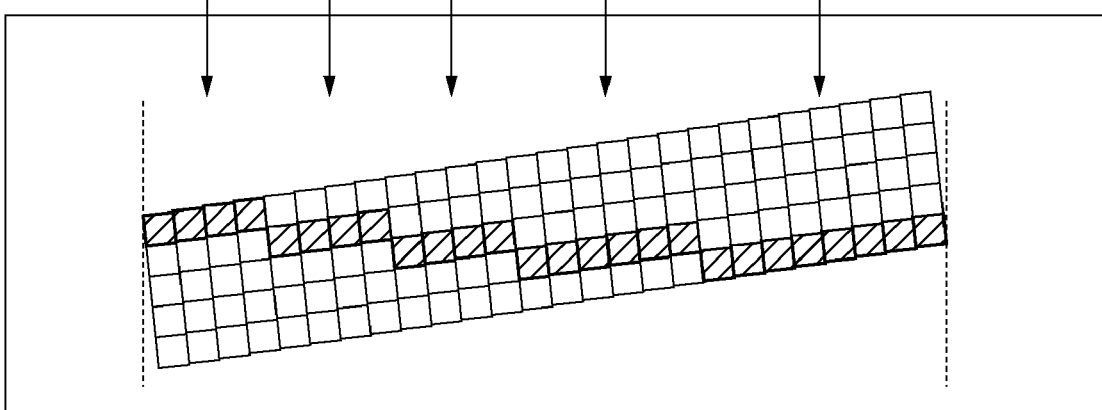
Figure 24A:
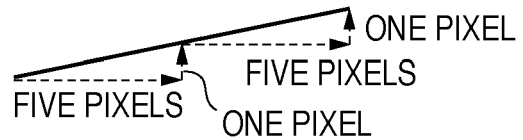
FIGS. 24A to 24E are views for explaining the conventional technique.
Figure 24B:
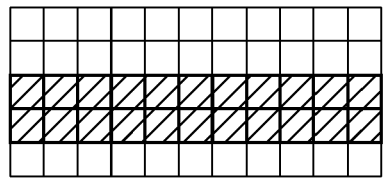
Figure 24C:
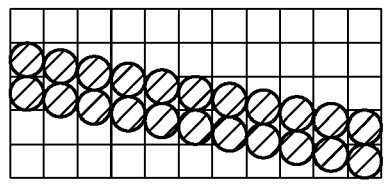
Figure 24D:
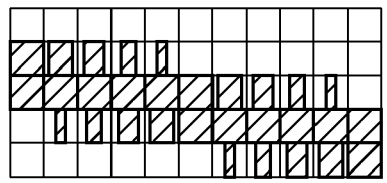
Figure 24E:
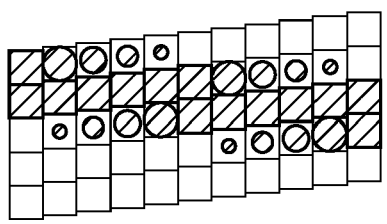

FIG. 19 shows the sequence of this process. For convenience of the following description, the thresholds TH1, TH2, and TH3 are represented as a predetermined value at once.

In step S1901, it is determined whether attribute data of a pixel to be processed represents the character attribute. If the attribute data represents the character attribute ("YES" in step S1901), the process shifts to step S1902. If the attribute data does not represent the character attribute ("NO" in step S1901), the process shifts to step S1914.

In step S1902, it is determined whether the C color component value is equal to or larger than a predetermined value. If the C color component value is equal to or larger than the predetermined value ("YES" in step S1902), the process shifts to step S1903. If the C color component value is smaller than the predetermined value ("NO" in step S1902), the process shifts to step S1904.

In step S1903, the character attribute accessory to the pixel is inherited as the attribute of the C color component, and the attribute data is enlarged in the sub-scanning direction. In step S1904, the C attribute is not output as the character attribute.

In step S1905, it is determined whether the M color component value is equal to or larger than a predetermined value. If the M color component value is equal to or larger than the predetermined value ("YES" in step S1905), the process shifts to step S1906. In step S1906, the character attribute accessory to the pixel is inherited as the attribute of the M color component, and the attribute data is enlarged in the sub-scanning direction. If the M color component value is smaller than the predetermined value ("NO" in step S1905), the process shifts to step S1907. In step S1907, the M attribute is not output as the character attribute.

Similarly in step S1908, it is determined whether the Y color component value is equal to or larger than a predetermined value. If the Y color component value is equal to or larger than the predetermined value ("YES" in step S1908), the process shifts to step S1909. In step S1909, the character attribute accessory to the pixel is inherited as the attribute of the Y color component, and the attribute data is enlarged in the sub-scanning direction. If the Y color component value is smaller than the predetermined value ("NO" in step S1908), the process shifts to step S1910, and the Y attribute is not output as the character attribute.

Finally in step S1911, it is determined whether the K color component value is equal to or larger than a predetermined value. If the K color component value is equal to or larger than the predetermined value ("YES" in step S1911), the character attribute accessory to the pixel is inherited as the attribute of the K color component, and the attribute data is enlarged in the sub-scanning direction (step S1912). If the K color component value is smaller than the predetermined value ("NO" in step S1911), the process shifts to step S1913, and the K attribute is not output as the character attribute.

In step S1914, it is determined whether all target pixels have been processed. If all target pixels have not been processed, the process returns to step S1901 to repetitively execute the above-described steps until all target pixels have been processed, completing the attribute correction process.

In FIG. 19, each color is independently determined. However, when two or more colors exceed a threshold, as shown in FIGS. 18C and 18D, determination may also be made not for each color, but by giving priority to a specific color component. For example, C is set as the top priority color, and the M, Y, and K thresholds when C pixel data is equal to or larger than a predetermined threshold, e.g., the first threshold may also be set respectively.

FIG. 20 is a table for explaining another example of attribute data inheritance conditions according to the second embodiment, and shows an example of the above-mentioned settings. In FIG. 20, C is set as the top priority color, and M and Y are determined. In FIG. 20, when C is equal to or larger than the threshold TH1, attribute data is enlarged in the sub-scanning direction, and significant information is output as the character attribute to the interpolation determining unit 109C of the C color component. M and Y are determined using determination thresholds set when C is equal to or larger than the threshold TH1. For example, the character attributes of the M and Y component values when the C color component is equal to or larger than the threshold TH1 are determined in accordance with four patterns: a pattern in which the M and Y color component values are equal to or larger than the threshold TH1, a pattern in which they are smaller than TH1 and equal to or larger than TH2, a pattern in which they are smaller than TH2 and equal to or larger than TH3, and a pattern in which they are smaller than TH3.

In FIG. 20, no character attribute is inherited when the M color component value is smaller than TH2. Also, no character attribute is inherited when the Y color component value is smaller than TH3. In this manner, the condition for inheriting the character attribute can be changed for each color. Even when a color other than C is set as the top priority color, the condition for inheriting the character attribute can be set based on the magnitude relationship with the threshold, similar to FIG. 20.

Although not shown in FIG. 20, when the C component value serving as the top priority color falls between TH1 and TH2, the first, second, and third thresholds TH1, TH2, and TH3 compared with the M component value may also be set separately from those set when the C component value exceeds TH1. That is, the thresholds of other color components may also be set in accordance with the value of the top priority color.

As shown in FIGS. 21A to 21D, it is also possible to change the first, second, and third thresholds TH1, TH2, and TH3 for each color component, and individually distribute attribute data accessory to a pixel. In addition, the settings in FIGS. 21A to 21D may also be combined with those in FIG. 20.

The three, first, second, and third thresholds TH1, TH2, and TH3 are prepared in the second embodiment, but the present invention is not limited to this. The number of thresholds may also be one in order to simply the configuration, or four or more in order to increase the precision.

According to any method, distribution of pixel attribute information representing the character attribute is determined using each color component value of the pixel, and significant attribute information is output for a color component which should inherit the character attribute. Thus, the second embodiment can solve the problem of the first embodiment.

More specifically, it can be controlled to enlarge character attribute data of image data in the sub-scanning direction and output the enlarged character attribute data to the interpolation determining unit 109C of the C color component, and not to output character attribute information to the interpolation determining unit 109M of the M color component. An interpolation process based on enlargement of the character attribute can be executed for only a specific color component, and the extent of influence of enlarging the character attribute can be limited to suppress the secondary adverse effect.

Similar to the first embodiment, the second embodiment also assumes a pixel having the character attribute, but the present invention is not limited to this. The present invention is applied to an attribute requiring interpolation of less than one pixel before and after a scan line changing point.

The present invention can also be applied to image data of an attribute requiring no interpolation of less than one pixel before and after a scan line changing point. In this case, for example, when attribute data represents a copy forgery-inhibited pattern image and a color component to be printed as the copy forgery-inhibited pattern image is input from a controller (not shown) to the attribute correction unit 117, attribute data of the copy forgery-inhibited pattern image may also be output to only the interpolation determining unit 109 for the color of this pattern image. This process can obviate the need to execute an interpolation determination process unique to copy forgery-inhibited pattern image data for color components other than the color of the copy forgery-inhibited pattern image. The precision of determining by the interpolation determining unit 109 whether or not to execute the interpolation process can increase.

As described above, according to the second embodiment, attribute information of each color component can be generated from attribute information accessory to a pixel by using the attribute information accessory to the pixel, and each color component value which forms the pixel. The second embodiment can reduce the influence of enlarging attribute information in the sub-scanning direction.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199900, filed Jul. 31, 2007, which is hereby incorporated by reference herein in its entirety.

What is claimed is:

1. An image forming apparatus having an image forming unit which forms an image by using an image carrier, an exposure unit for exposing the image carrier, and a developing unit for visualizing, with a printing material, an electrostatic latent image generated by exposure, the apparatus comprising:
a profile storage unit configured to store a profile representing a shift amount of an exposure position in a sub-scanning direction when exposing the image carrier while scanning the image carrier in a main scanning direction;
a determination unit configured to determine, based on the profile, a pixel position in the main scanning direction where the shift amount in the sub-scanning direction is to be compensated;
an image data storage unit configured to store image data containing density values of color components and first attribute data for each pixel;
a readout unit configured to read out the image data from the image data storage unit by shifting a readout position in the sub-scanning direction at the determined pixel position;
an attribute correction unit configured to correct the first attribute data serving as part of the image data by referring to the first attribute data of the readout image data, and when the first attribute data representing a specific attribute exists, enlarge, in a direction corresponding to a direction in which the readout position is shifted, an area where the first attribute data representing the specific attribute exists; and
an interpolation unit configured to interpolate a pixel value for image data within an area determined based on the corrected first attribute data,
wherein an image is formed using the interpolated pixel value.

2. The apparatus according to claim 1, wherein the attribute correction unit generates second attribute data for each color component on the basis of the density values of the color components of a pixel having the first attribute data representing the specific attribute, and performs the correction on the basis of the second attribute data.

3. The apparatus according to claim 2, wherein the attribute correction unit compares the density value of each color component with a threshold, generates the second attribute data representing the specific attribute for a color component having a density value not smaller than the threshold, and generates the second attribute data representing no specific attribute for a color component having a density value smaller than the threshold.

4. The apparatus according to claim 3, wherein
the threshold includes a first threshold, a second threshold smaller than the first threshold, and a third threshold smaller than the second threshold, and
when a density value of a specific color component among the color components is not smaller than the first threshold, the attribute correction unit determines, based on magnitude relationships between density values of remaining color components and the first to third thresholds, whether to generate the second attribute data representing the specific attribute for the remaining color components.

5. The apparatus according to claim 3, wherein the threshold is set for each color component.

6. The apparatus according to claim 1, wherein the specific attribute includes a character attribute or a thin line attribute.

7. A method of controlling an image forming apparatus having an image forming unit which forms an image by using an image carrier, an exposure unit for exposing the image carrier, and a developing unit for visualizing, with a printing material, an electrostatic latent image generated by exposure, and an image data storage unit that stores image data containing density values of color components and first attribute data for each pixel, the method comprising:
a determination step of determining, based on a profile representing a shift amount of an exposure position in a sub-scanning direction when exposing the image carrier while scanning the image carrier in a main scanning direction, a pixel position in the main scanning direction where the shift amount in the sub-scanning direction is to be compensated;

a readout step of reading out the image data from the image data storage unit by shifting a readout position in the sub-scanning direction at the determined pixel position;

an attribute correction step of correcting the first attribute data serving as part of the image data by referring to the first attribute data of the readout image data, and when the first attribute data representing a specific attribute exists, enlarging, in a direction corresponding to a direction in which the readout position is shifted, an area where the first attribute data representing the specific attribute exists;

an interpolation step of interpolating a pixel value for image data within an area determined based on the corrected first attribute data; and an image forming step of forming an image by using the interpolated pixel value.

8. The method according to claim 7, wherein in the attribute correction step, second attribute data is generated for each color component on the basis of the density values of the color components of a pixel having the first attribute data representing the specific attribute, and the correction is performed based on the second attribute data.

9. The method according to claim 8, wherein in the attribute correction step, the density value of each color component is compared with a threshold, the second attribute data representing the specific attribute is generated for a color component having a density value not smaller than the threshold, and the second attribute data representing no specific attribute is generated for a color component having a density value smaller than the threshold.

10. The method according to claim 9, wherein the threshold includes a first threshold, a second threshold smaller than the first threshold, and a third threshold smaller than the second threshold, and in the attribute correction step, when a density value of a specific color component among the color components is not smaller than the first threshold, whether to generate the second attribute data representing the specific attribute for remaining color components is determined based on magnitude relationships between density values of the remaining color components and the first to third thresholds.

11. The method according to claim 9, wherein the threshold is set for each color component.

12. The method according to claim 7, wherein the specific attribute includes a character attribute or a thin line attribute.

13. A computer readable medium storing a computer program causing a computer to execute a method defined in claim 7.

* * * * *